(12) United States Patent
Ito et al.

(10) Patent No.: US 12,275,854 B2
(45) Date of Patent: Apr. 15, 2025

(54) CURABLE COMPOSITION, FILM FORMING METHOD AND ARTICLE MANUFACTURING METHOD

(71) Applicant: CANON KABUSHIKI KAISHA, Tokyo (JP)

(72) Inventors: Yuto Ito, Tokyo (JP); Toshiki Ito, Kanagawa (JP); Isao Kawata, Kanagawa (JP); Fen Wan, Austin, TX (US); Timothy Stachowiak, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 17/991,098

(22) Filed: Nov. 21, 2022

(65) Prior Publication Data
US 2024/0191088 A1   Jun. 13, 2024

(51) Int. Cl.
*C09D 11/30* (2014.01)
*B29C 59/00* (2006.01)
(Continued)

(52) U.S. Cl.
CPC ............ *C09D 11/30* (2013.01); *B29C 59/005* (2013.01); *B29C 59/026* (2013.01); *B41J 3/407* (2013.01);
(Continued)

(58) Field of Classification Search
CPC .... C09D 11/30; C09D 11/108; C09D 125/02; B29C 59/005; B29C 59/026; B41J 3/407;
(Continued)

(56) References Cited

U.S. PATENT DOCUMENTS

2016/0372640 A1\* 12/2016 Ogawa ................. C09D 183/08
2019/0250505 A1   8/2019 LaBrake et al.
2021/0394230 A1  12/2021 Ito et al.

FOREIGN PATENT DOCUMENTS

JP   2007269891 A   10/2007
JP   2009503139 A    1/2009
(Continued)

OTHER PUBLICATIONS

International Search Report issued in Intl. Appln. No. PCT/JP2023/041465, mailed Dec. 19, 2023.
(Continued)

*Primary Examiner* — Yaovi M Ameh
(74) *Attorney, Agent, or Firm* — ROSSI, KIMMS & McDOWELL LLP

(57) ABSTRACT

A curable composition containing a polymerizable compound (a), a photopolymerization initiator (b), and a solvent (c), wherein the curable composition has viscosity of not less than 2 mPa·s and not more than 60 mPa·s at 23° C., a content of the solvent (d) with respect to the whole curable composition is not less than 5 vol % and not more than 95 vol %, a boiling point of the solvent (d) at normal pressure is less than 250° C., and the polymerizable compound (a) contains a compound (a-1) containing not less than one aromatic ring or aromatic heterocycle, and not less than four vinyl groups directly bonding to the aromatic ring or the aromatic heterocycle.

12 Claims, 5 Drawing Sheets

(51) Int. Cl.
  *B29C 59/02* (2006.01)
  *B41J 3/407* (2006.01)
  *C08F 112/32* (2006.01)
  *C08F 112/34* (2006.01)
  *C09D 11/108* (2014.01)
  *C09D 125/02* (2006.01)
  *B29K 25/00* (2006.01)

(52) U.S. Cl.
  CPC .......... *C08F 112/32* (2013.01); *C08F 112/34* (2013.01); *C09D 11/108* (2013.01); *C09D 125/02* (2013.01); *B29K 2025/00* (2013.01)

(58) Field of Classification Search
  CPC ... C08F 112/34; C08F 112/32; B29K 2025/00
  See application file for complete search history.

(56) References Cited

FOREIGN PATENT DOCUMENTS

| | | | | |
|---|---|---|---|---|
| JP | 4909846 B2 | * | 4/2012 | ............ C08F 283/08 |
| JP | 2019140394 A | | 8/2019 | |
| JP | 6584578 B2 | | 10/2019 | |
| JP | 2020026515 A | * | 2/2020 | ............ B29C 59/02 |
| WO | 2007050133 A2 | | 5/2007 | |
| WO | 2022132356 A1 | | 6/2022 | |
| WO | 2023129311 A2 | | 7/2023 | |

OTHER PUBLICATIONS

Written Opinion issued in Intl. Appln. No. PCT/JP2023/041465, mailed Dec. 19, 2023.
Proc. SPIE. "Advanced materials to enhance the productivity of Nanoimprint lithography". 11324-11 (2020). Cited in Specification.
Allen. "Introduction to Molecular Dynamics Simulation." Computational Soft Matter: From Synthetic Polymers to Proteins. 2004: 1-28. vol. 23, No. 1. Cited in Specification.
Daivis. "A simple, direct derivation and proof of the validity of the SLLOD equations of motion for generalized homogeneous flows." The Journal of Chemical Physics. 2006: 194103. vol. 124. Cited in Specification.
Edwards. "A validation of the p-SLLOD equations of motion for homogeneous steady-state flows." The Journal of Chemical Physics. 2006: 194104. vol. 124. Cited in Specification.
Eastwood. "P3M3DP—The Three-Dimensional Periodic Particle-Particle/Particle-Mesh Program." Computer Physics Communications 35. 1984: 618. Computer Physics Communications 19. 1980:C-618-C-619. Cited in Specification.
Ryckaert. "Numerical Inegration of the Cartesian Equations of Motion of a System with Constraints: Molecular Dynamics of n-Alkanes." Journal of Computational Physics. 1977: 327-341, vol. 23. Cited in Specification.
Nose. "A unified formulation of the constant temperature molecular-dynamics methods". Journal of Chemical Physics. 1984: 511-519. vol. 81, No. 1. Cited in Specification.
Hoover. "Canonical dynamics: Equilibrium phase-space distributions". The American Physical Society. Physical Review. Mar. 1985: 1695-1697. vol. 31, No. 3. Cited in Specification.
Besler. "Atomic Charges Derived from Semiempirical Methods". Journal of Computational Chemistry. 1990: 431-439. vol. 11, No. 4. Cited in Specification.
Singh. "An Approach to Computing Electrostatic Charges for Molecules", Journal of Computational Chemistry. 1984: 129-145. vol. 5, No. 2. Cited in Specification.
Wang. "Development and Testing of a General Amber Force Field". Journal of Computational Chemistry. 2004: 1157-1174. vol. 25, No. 9. Cited in Specification.

* cited by examiner

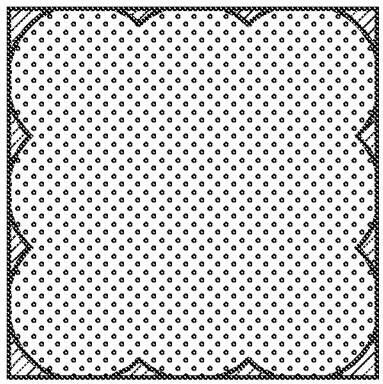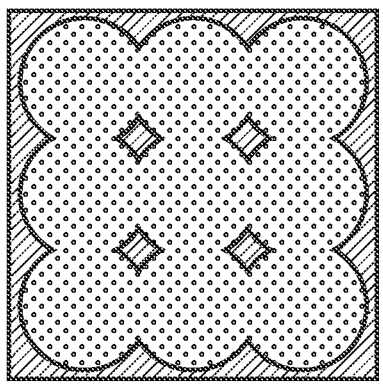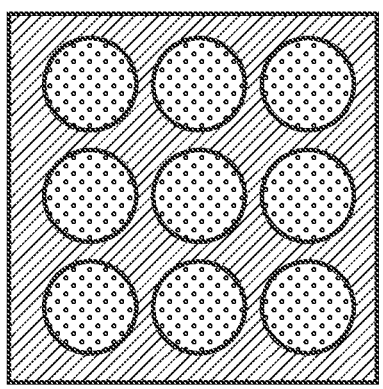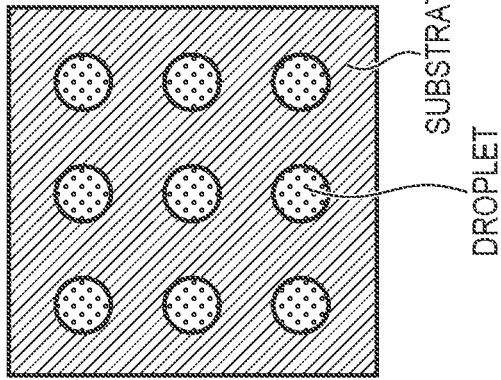

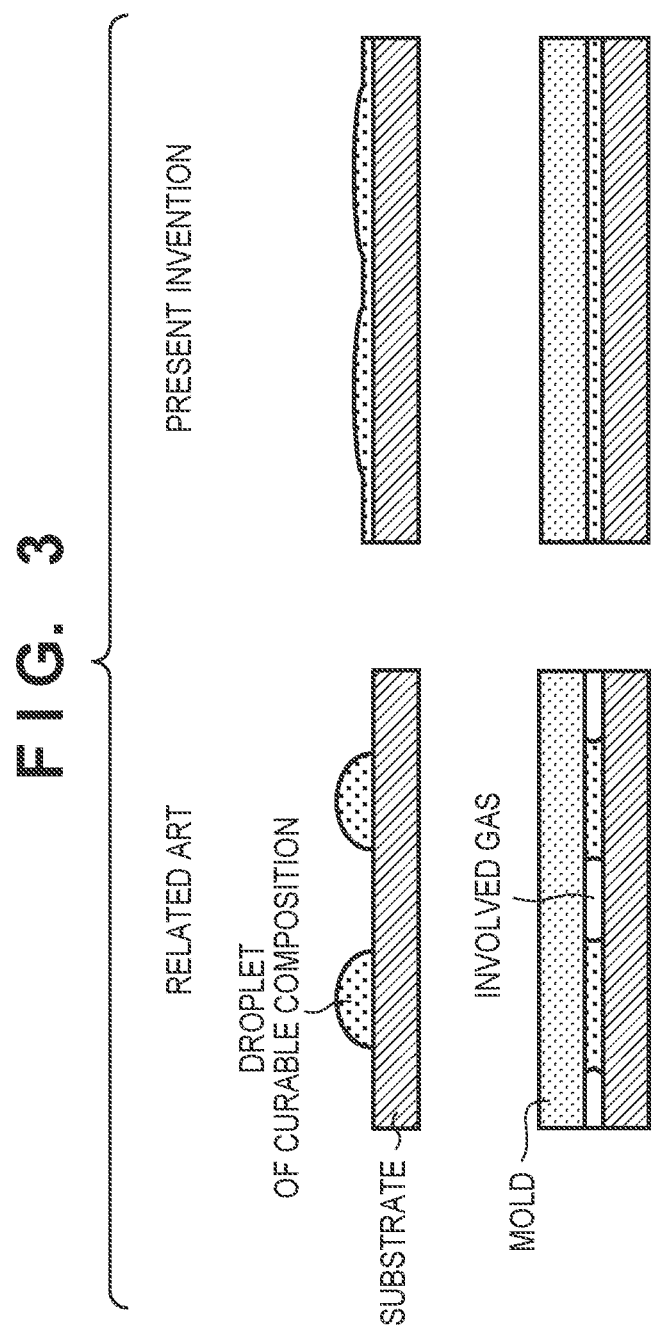

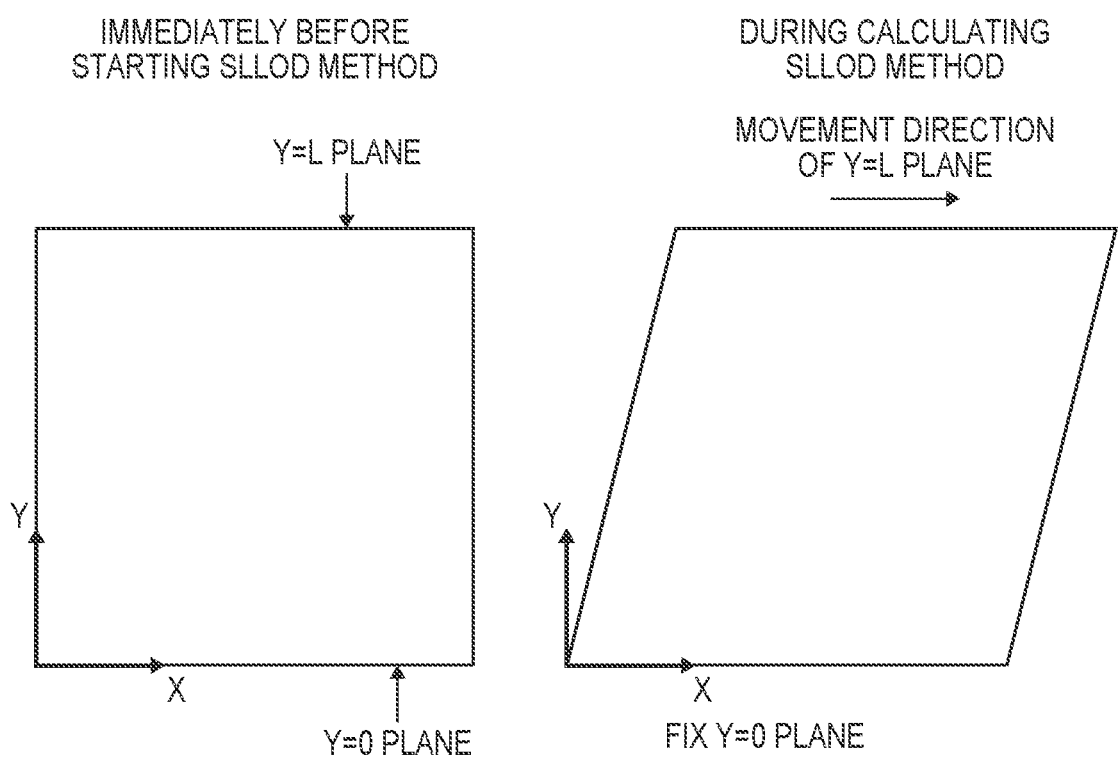

CURABLE COMPOSITION, FILM FORMING METHOD AND ARTICLE MANUFACTURING METHOD

BACKGROUND OF THE INVENTION

Field of the Invention

The present invention relates to a curable composition, a film forming method, and an article manufacturing method.

Description of the Related Art

A photolithography step of fabricating a semiconductor device requires planarization of a substrate. For example, in an extreme ultraviolet exposure technique (EUV) as a photolithography technique attracting attention in recent years, the depth of focus at which a projected image is formed decreases as miniaturization advances, so the unevenness on the surface of a substrate must be decreased to a few tens of nanometers or less. Flatness equivalent to that of EUV is required in an imprint technique as well, in order to improve the filling properties of a curable composition and the line width accuracy.

As a planarization technique, each of Japanese Patent No. 6584578 and Japanese Patent Laid-Open No. 2019-140394 has proposed a technique of obtaining a flat surface by discretely dropping (arranging), on an uneven substrate, droplets of a curable composition in an amount corresponding to the unevenness, and curing the curable composition in a state in which a mold having a flat surface is in contact with the curable composition. A film (flat film) formed by the planarizing technique as described above is required to have not only flatness but also a high heat resistance of, for example, 400° C. or more.

Unfortunately, it is difficult to form a flat film having a high heat resistance by using the materials disclosed in Japanese Patent No. 6584578 and Japanese Patent Laid-Open No. 2019-140394.

SUMMARY OF THE INVENTION

The present invention provides a novel technique related to a curable composition.

A curable composition as one aspect of the present invention is that a curable composition containing a polymerizable compound (a), a photopolymerization initiator (b), and a solvent (c), wherein the curable composition has viscosity of not less than 2 mPa·s and not more than 60 mPa·s at 23° C., a content of the solvent (d) with respect to the whole curable composition is not less than 5 vol % and not more than 95 vol %, a boiling point of the solvent (d) at normal pressure is less than 250° C., and the polymerizable compound (a) contains a compound (a-1) containing not less than one aromatic ring or aromatic heterocycle, and not less than four vinyl groups directly bonding to the aromatic ring or the aromatic heterocycle.

Further aspects of the present invention will become apparent from the following description of exemplary embodiments with reference to the attached drawings.

BRIEF DESCRIPTION OF THE DRAWINGS

FIGS. 2A to 2D are views for explaining a flow behavior in a curable composition droplet waiting step;

FIG. 3 is a view showing comparison between a contact step of related art and a contact step of the present invention;

FIG. 5 is a view for explaining the SLLOD method calculation.

DESCRIPTION OF THE EMBODIMENTS

Figure 1A:
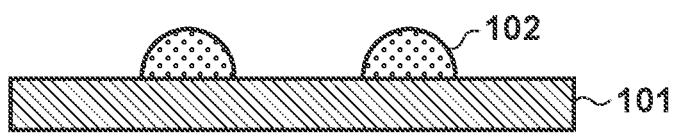
FIGS. 1A to 1G are views for explaining a pattern forming method (film forming method) as one aspect of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

When providing a novel technique related to a curable composition, the present inventors have found that a curable composition containing a polymerizable compound that contains one or more aromatic rings or aromatic heterocycles and contains four or more vinyl groups directly combining with the aromatic rings or aromatic heterocycles has a high heat resistance. However, this curable composition has high viscosity, so there is room for improvement in order to discretely drop (arrange) droplets of the curable composition by using an inkjet method. Note that the novel technique related to a curable composition includes, for example, a curable composition for manufacturing a flat film having a high heat resistance and a planarizing technique.

Curable Composition

A curable composition (A) of the present invention is a curable composition for inkjet. The curable composition (A) of the present invention is a composition containing at least a component (a) as a polymerizable compound, a component (b) as a photopolymerization initiator, and a component (d) as a solvent. The component (a) as a polymerizable compound of the present invention contains at least a compound (a-1) containing one or more aromatic rings or aromatic heterocycles and containing four or more vinyl groups directly combining with the aromatic rings or aromatic heterocycles. The curable composition (A) of the present invention can further contain a nonpolymerizable compound (c).

In this specification, a cured film means a film cured by polymerizing the curable composition on a substrate. Note that the shape of the cured film is not particularly limited, so the film can have a pattern shape on the surface. Also, a cured film remaining between a recessed portion of the cured film of the curable composition (a projecting portion of a mold pattern) and the substrate will be called a residual film.

Component (a): Polymerizable Compound

The component (a) is a polymerizable compound. In this specification, the polymerizable compound is a compound that reacts with a polymerizing factor (for example, a radical) generated from a photopolymerization initiator (the component (b)), and forms a film made of a polymer compound by a chain reaction (polymerization reaction).

An example of the polymerizable compound as described above is a radical polymerizable compound. The polymerizable compound as the component (a) can be formed by only one type of a polymerizable compound, and can also be formed by a plurality of types (one or more types) of polymerizable compounds.

As described above, the component (a) as a polymerizable compound of the present invention contains at least the compound (a-1) that contains one or more aromatic rings or aromatic heterocycles and four or more vinyl groups directly bonding to the aromatic rings or aromatic heterocycles.

<Compound (a-1): Polymerizable Compound>

Practical examples of the compound (a-1) are as follows. However, the compound (a-1) is not limited to these examples.

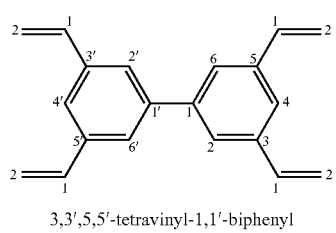

3,3′,5,5′-tetravinyl-1,1′-biphenyl

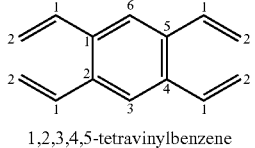

1,2,3,4,5-tetravinylbenzene

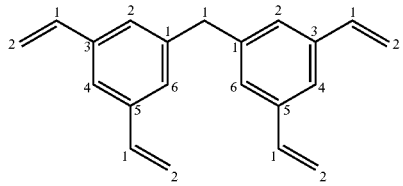

Bis(3,5-divinylphenyl)methane

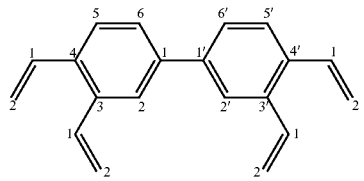

3,3′,4,4′-tetravinyl-1,1′-biphenyl

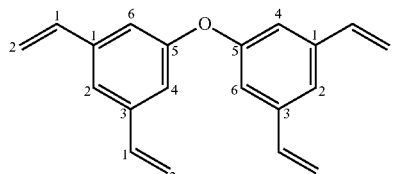

5,5′-oxybis(1,3-divinylbenzene)

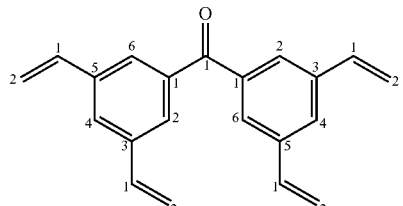

Bis(3,5-divinylphenyl)methanone

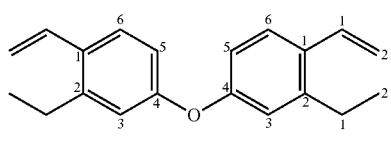

4,4′-oxybis(1,2-divinylbenzene)

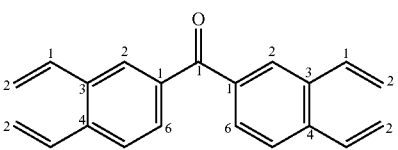

Bis(3,4-divinylphenyl)methanone

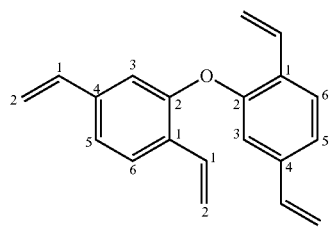

2,2′-oxybis(1,4-divinylbenzene)

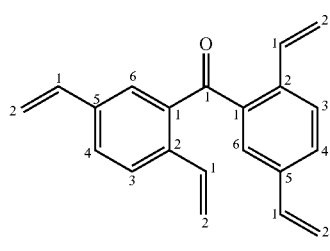

Bis(2,5-divinylphenyl)methanone

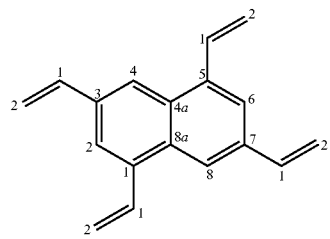

1,3,5,7-tetravinylapthalene

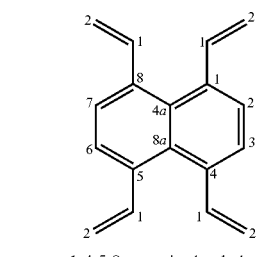

1,4,5,8-tetravinylapthalene

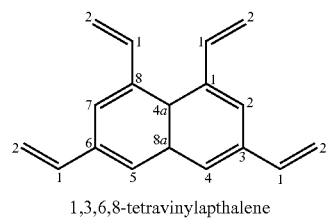

1,3,6,8-tetravinylapthalene

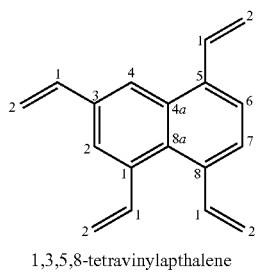

1,3,5,8-tetravinylapthalene

Examples of the component (a) not corresponding to the compound (a-1) are a (meth)acrylic compound, a styrene-based compound, a vinyl-based compound, an aryl-based compound, a fumaric compound, and a maleic compound, as radical polymerizable compounds.

The (meth)acrylic compound is a compound having one or more acryloyl groups or methacryloyl groups. Examples of a monofunctional (meth)acrylic compound having one acryloyl group or methacryloyl group are as follows, but the compound is not limited to these examples.

Phenoxyethyl (meth)acrylate, phenoxy-2-methyl ethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, (meth)acrylate of EO-modified p-cumylphenol, 2-bromophenoxyethyl (meth)acrylate, 2,4-dibromophenoxyethyl (meth)acrylate, 2,4,6-tribromophenoxyethyl (meth)acrylate, EO-modified phenoxy (meth)acrylate, PO-modified phenoxy (meth)acrylate, polyoxyethylenenonylphenylether (meth)acrylate, isobornyl (meth)acrylate, 1-adamantyl (meth)acrylate, 2-methyl-2-adamantyl (meth)acrylate, 2-ethyl-2-adamantyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl(meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, tetrahydrofurfuryl (meth)acrylate, butoxyethyl (meth)acrylate, ethoxydiethyleneglycol (meth)acrylate, polyethyleneglycol mono(meth)acrylate, polypropyleneglycol mono(meth)acrylate, methoxyethyleneglycol (meth)acrylate, ethoxyethyl (meth)acrylate, methoxypolyethyleneglycol (meth)acrylate, methoxypolypropyleneglycol (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, 1- or 2-naphthyl (meth)acrylate, 1- or 2-naphthylmethyl (meth)acrylate, 3- or 4-phenoxybenzyl (meth)acrylate, and cyanobenzyl (meth)acrylate.

Examples of commercially available products of the above-described monofunctional (meth)acrylic compounds are as follows, but the products are not limited to these examples.

ARONIX® M101, M102, M110, M111, M113, M117, M5700, TO-1317, M120, M150, and M156 (manufactured by TOAGOSEI); MEDOL10, MIBDOL10, CHDOL10, MMDOL30, MEDOL30, MIBDOL30, CHDOL30, LA, IBXA, 2-MTA, HPA, and Viscoat #150, #155, #158, #190, #192, #193, #220, #2000, #2100, and #2150 (manufactured by OSAKA ORGANIC CHEMICAL INDUSTRY); Light Acrylate BO-A, EC-A, DMP-A, THF-A, HOP-A, HOA-MPE, HOA-MPL, PO-A, P-200A, NP-4EA, NP-BEA, Epoxy Ester M-600A, POB-A, and OPP-EA (manufactured by KYOEISHA CHEMICAL); KAYARAD® TC110S, R-564, and R-128H (manufactured by NIPPON KAYAKU); NK Ester AMP-10G, AMP-20G, and A-LEN-10 (manufactured by SHIN-NAKAMURA CHEMICAL); FA-511A, 512A, and 513A (manufactured by Hitachi Chemical); PHE, CEA, PHE-2, PHE-4, BR-31, BR-31M, and BR-32 (manufactured by DKS); VP (manufactured by BASF); and ACMO, DMAA, and DMAPAA (manufactured by Kohjin).

Examples of a polyfunctional (meth)acrylic compound having two or more acryloyl groups or methacryloyl groups are as follows, but the compound is not limited to these examples.

Trimethylolpropane di(meth)acrylate, trimethylolpropane tri(meth)acrylate, EO-modified trimethylolpropane tri(meth)acrylate, PO-modified trimethylolpropane tri(meth)acrylate, EO- and PO-modified trimethylolpropane tri(meth)acrylate, dimethylol tricyclodecane di(meth)acrylate, pentaerythritol tri(meth)acrylate, pentaerythritol tetra(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, 1,3-adamantanedimethanol di(meth)acrylate, tris(2-hydroxyethyl)isocyanurate tri(meth)acrylate, tris(acryloyloxy)isocyanurate, bis(hydroxymethyl)tricyclodecane di(meth)acrylate, dipentaerythritol penta(meth)acrylate, dipentaerythritol hexa(meth)acrylate, EO-modified 2,2-bis(4-((meth)acryloxy)phenyl) propane, PO-modified 2,2-bis(4-((meth)acryloxy)phenyl) propane, EO- and PO-modified 2,2-bis(4-((meth)acryloxy) phenyl)propane, o-, m-, or p-benzene di(meth)acrylate, and o-, m-, or p-xylylene di(meth)acrylate.

Examples of commercially available products of the above-described polyfunctional (meth)acrylic compounds are as follows, but the products are not limited to these examples.

Yupimer® UV SA1002 and SA2007 (manufactured by Mitsubishi Chemical); Viscoat #195, #230, #215, #260, #335HP, #295, #300, #360, #700, GPT, and 3PA (manufactured by OSAKA ORGANIC CHEMICAL INDUSTRY); Light Acrylate 4EG-A, 9EG-A, NP-A, DCP-A, BP-4EA, BP-4PA, TMP-A, PE-3A, PE-4A, and DPE-6A (manufactured by KYOEISHA CHEMICAL); KAYARAD® PET-30, TMPTA, R-604, DPHA, DPCA-20, -30, -60, and -120, HX-620, D-310, and D-330 (manufactured by NIPPON KAYAKU); ARONIX® M208, M210, M215, M220, M240, M305, M309, M310, M315, M325, and M400 (manufactured by TOAGOSEI); Ripoxy® VR-77, VR-60, and VR-90 (manufactured by Showa Highpolymer); and OGSOL EA-0200 and OGSOL EA-0300 (manufactured by Osaka Gas Chemicals).

Note that in the above-described compound county, (meth)acrylate means acrylate or methacrylate having an alcohol residue equal to acrylate. A (meth)acryloyl group means an acryloyl group or a methacryloyl group having an alcohol residue equal to the acryloyl group. EO indicates ethylene oxide, and an EO-modified compound A indicates a compound in which a (meth)acrylic acid residue and an alcohol residue of a compound A bond via the block structure of an ethylene oxide group. Also, PO indicates a propylene oxide, and a PO-modified compound B indicates a compound in which a (meth)acrylic acid residue and an alcohol residue of a compound B bond via the block structure of a propylene oxide group.

Practical examples of the styrene-based compound are as follows, but the compound is not limited to these examples.

Alkylstyrene such as styrene, 2,4-dimethyl-α-methylstyrene, o-methylstyrene, m-methylstyrene, p-methylstyrene, 2,4-dimethylstyrene, 2,5-dimethylstyrene, 2,6-dimethylstyrene, 3,4-dimethylstyrene, 3,5-dimethylstyrene, 2,4,6-trimethylstyrene, 2,4,5-trimethylstyrene, pentamethylstyrene, o-ethylstyrene, m-ethylstyrene, p-ethylstyrene, diethylstyrene, triethylstyrene, propylstyrene 2,4-diisopropylstyrene, butylstyrene, hexylstyrene, heptylstyrene, and octylstyrene; styrene halide such as fluorostyrene, o-chlorostyrene, m-chlorostyrene, p-chlorostyrene, o-bromostyrene, m-bromostyrene, p-bromostyrene, dibromostyrene, and iodostyrene; and a compound having a styryl group as a polymerizable functional group, such as nitrostyrene, acetylstyrene, o-methoxystyrene, m-methoxystyrene, p-methoxystyrene, o-hydroxystyrene, m-hydroxystyrene, p-hydroxystyrene, 2-vinylbiphenyl, 3-vinylbiphenyl, 4-vinylbiphenyl, 1-vinylnaphthalene, 2-vinylnaphthalene, 4-vinyl-p-terphenyl, 1-vinylanthracene, α-methylstyrene, o-isopropenyltoluene, m-isopropenyltoluene, p-isopropenyltoluene, 2,3-dimethyl-α-methylstyrene, 3,5-dimethyl-α-methylstyrene, p-isopropyl-α-methylstyrene, α-ethylstyrene, α-chlorostyrene, divinylbenzene, diisopropylbenzene, and divinylbiphenyl.

Practical examples of the vinyl-based compound are as follows, but the compound is not limited to these examples.

Vinylpyridine, vinylpyrrolidone, vinylcarbazole, vinyl acetate, and acrylonitrile; conjugated diene monomers such as butadiene, isoprene, and chloroprene; vinyl halide such as vinyl chloride and vinyl bromide; a compound having a vinyl group as a polymerizable functional group, for example, vinylidene halide such as vinylidene chloride, vinyl ester of organic carboxylic acid and its derivative (for example, vinyl acetate, vinyl propionate, vinyl butyrate, vinyl benzoate, and divinyl adipate, and (meth)acrylonitrile.

Note that in this specification, (meth)acrylonitrile is a general term for acrylonitrile and methacrylonitrile.

Examples of the acrylic compound are as follows, but the compound is not limited to these examples.

Aryl acetate, aryl benzoate, diaryl adipate, diaryl terephthalate, diaryl isophthalate, and diaryl phthalate.

Examples of the fumaric compound are as follows, but the compound is not limited to these examples.

Dimethyl fumarate, diethyl fumarate, diisopropyl fumarate, di-sec-butyl fumarate, diisobutyl fumarate, di-n-butyl fumarate, di-2-ethylhexyl fumarate, and dibenzyl fumarate.

Examples of the maleic compound are as follows, but the compound is not limited to these examples.

Dimethyl maleate, diethyl maleate, diisopropyl maleate, di-sec-butyl maleate, diisobutyl maleate, di-n-butyl maleate, di-2-ethylhexyl maleate, and dibenzyl maleate.

Other examples of the radical polymerizable compound are as follows, but the compound is not limited to these examples.

Dialkylester of itaconic acid and its derivative (for example, dimethyl itaconate, diethyl itaconate, diisopropyl itaconate, di-sec-butyl itaconate, diisobutyl itaconate, di-n-butyl itaconate, di-2-ethylhexyl itaconate, and dibenzyl itaconate), an N-vinylamide derivative of organic carboxylic acid (for example, N-methyl-N-vinylacetamide), and maleimide and its derivative (for example, N-phenylmaleimide and N-cyclohexylmaleimide).

When the component (a) is formed by a plurality of types of compounds, the ratio of the compound corresponding to (a-1) of (a) is preferably 20 wt % or more, more preferably 50 wt % or more, and further preferably 90 wt % or more. This is so because the heat resistance increases as the ratio of (a-1) increases.

The film forming method of the present invention requires a few milliseconds to a few hundreds of seconds until droplets of the curable composition (A) discretely arranged on a substrate combine with each other and form a practically continuous liquid film, so a waiting step (to be described later) is necessary. In this waiting step, the solvent (d) is volatilized, but the polymerizable compound (a) is not volatilized. Accordingly, in the polymerizable compound (a) that can contain a plurality of types of compounds, the boiling points of all the compounds at normal pressure (1 atm) are preferably 250° C. or more, more preferably 300° C. or more, and further preferably 350° C. or more. Also, to obtain a high dry etching resistance and a high heat resistance, the cured film of the curable composition (A) preferably contains at least a compound having a cyclic structure such as an aromatic structure, an aromatic heterocyclic structure, or an alicyclic structure.

The boiling point of the polymerizable compound (a) is substantially correlated with the molecular weight. Therefore, the molecular weights of all the polymerizable compounds (a) are preferably 200 or more, more preferably 240 or more, and further preferably 250 or more. However, even when the molecular weight is 200 or less, the compound is preferably usable as the polymerizable compound (a) of the present invention if the boiling point is 250° C. or more. In addition, the vapor pressure at 80° C. of the polymerizable compound (a) is preferably 0.001 mmHg or less. This is so because, although it is favorable to heat the curable composition when accelerating volatilization of the solvent (component (d)) (to be described later), it is necessary to suppress volatilization of the polymerizable compound (a) during heating.

Note that the boiling point and the vapor pressure of each organic compound at normal pressure can be calculated by, for example, Hansen Solubility Parameters in Practice (HSPiP) 5th Edition. 5.3.04.

Ohnishi Parameter of Component (a)

It is known that a dry etching rate V of an organic compound, a number N of all atoms in the organic compound, a number $N_C$ of all carbon atoms in a composition, and a number $N_O$ of all oxygen atoms in the composition have a relationship of equation (1) below (see literature A):

Literature A: Proc. SPIE 11324-11 (2020)

$$V \propto N/(N_C - N_O) \quad (1)$$

where $N/(N_C - N_O)$ is also called "Ohnishi Parameter" (to be referred to as "OP" hereinafter). For example, Japanese Patent Laid-Open No. 2009-503139 has disclosed a technique of obtaining a photocurable composition having a high dry etching resistance by using a polymerizable compound having a small OP.

Equation (1) indicates that an organic compound having many oxygen atoms in a molecule or having few aromatic ring structures or alicyclic structures has a large OP and a high dry etching rate.

In the curable composition to be used in the present invention, the OP of the component (a) is preferably 1.80 or more and 2.70 or less, more preferably 2.00 or more and 2.60 or less, and further preferably 2.30 or more and 2.60 or less. When the OP of the component (a) is 2.70 or less, the cured film of the curable composition (A) has a high dry etching resistance. Also, when the OP of the component (a) is 1.80 or more, the cured film of the curable composition (A) can easily be removed when the underlayer is processed by using the cured film of the curable composition (A). When the component (a) is formed by a plurality of types polymerizable compounds $a_1, a_2, \ldots, a_n$, the OP is calculated as a weighted average value (molar fraction weighted average value) based on the molar fraction as indicated by equation (2) below:

$$OP = \sum_{i=n} n_i OP_i = n_1 OP_1 + n_2 OP_2 + \ldots + n_n OP_n \quad (2)$$

where $OP_n$ is the OP of the component $a_n$, and $n_n$ is the molar fraction occupied by the component $a_n$ in the entire component (a).

Compound (a-2): Polymerizable Compound Having Boiling Point of 250° C. or More

The component (a) as the polymerizable compound of the present invention can contain a compound (a-2) which has two or more cyclic structures and in which at least one of them is an aromatic structure or an aromatic heterocyclic structure.

Examples of the cyclic structure are an aromatic structure, an aromatic heterocyclic structure, and an alicyclic structure. The carbon number of the aromatic structure is preferably 6 to 22, more preferably 6 to 18, and further preferably 6 to 10. Practical examples of the aromatic ring are a benzene ring, a naphthalene ring, an anthracene ring, a phenanthrene ring, a phenalene ring, a fluorene ring, a benzocyclooctene ring, an acenaphthylene ring, a biphenylene ring, an indene ring, an indane ring, a triphenylene ring, a pyrene ring, a chrysene ring, a perylene ring, and a tetrahydronaphthalene ring.

Of the above-described aromatic rings, a benzene ring or a naphthalene ring is preferable, and a benzene ring is more preferable. The aromatic ring can have a structure in which a plurality of rings are connected. Examples are a biphenyl ring and a bisphenyl ring.

The carbon number of the aromatic heterocyclic structure is preferably 1 to 12, more preferably 1 to 6, and further preferably 1 to 5. Practical examples of the aromatic heterocycle are as follows.

A thiophene ring, a furan ring, a pyrolle ring, an imidazole ring, a pyrazole ring, a triazole ring, a tetrazole ring, a thiazole ring, a thiadiazole ring, an oxadiazole ring, an oxazole ring, a pyridine ring, a pyrazine ring, a pyrimidine ring, pyridazine ring, an isoindole ring, an indole ring, an indazole ring, a purine ring, a quinolizine ring, an isoquinoline ring, a quinoline ring, a phthalazine ring, a naphthyridine ring, a quinoxaline ring, a quinazoline ring, a cinnoline ring, a carbazole ring, an acridine ring, a phenazine ring, a phenothiazine ring, a phenoxathiine ring, and a phenoxazine ring.

The carbon number of the alicyclic structure is preferably 3 or more, more preferably 4 or more, and further preferably 6 or more. In addition, the carbon number of the alicyclic structure is preferably 22 or less, more preferably 18 or less, further preferably 6 or less, and still further preferably 5 or less. Practical examples are as follows.

A cyclopropane ring, a cyclobutane ring, a cyclobutene ring, a cyclopentane ring, a cyclohexane ring, a cyclohexene ring, a cycloheptane ring, a cyclooctane ring, a dicyclopentadiene ring, a spirodecane ring, a spirononane ring, a tetrahydro dicyclopentadiene ring, an octahydronaphthalene ring, a decahydronaphthalene ring, a hexahydroindane ring, a bornane ring, a norbornane ring, a norbornene ring, an isobornane ring, a tricyclodecane ring, a tetracyclododecane ring, and an adamantane ring.

Practical examples of the compound (a-2) having a boiling point of 250° C. or more are as follows, but the compound is not limited to these examples. 3-phenoxybenzyl acrylate (mPhOBzA, OP=2.54, boiling point=367.4° C., 80° C. vapor pressure=0.0004 mmHg, molecular weight=254.3)

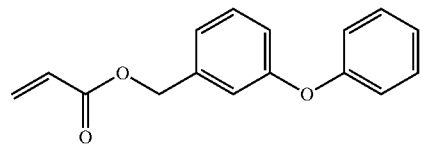 [SMILES: C=CC(=O)OCc1cccc(Oc2ccccc2)c1]

1-naphthyl acrylate (NaA, OP=2.27, boiling point=317° C., 80° C. vapor pressure=0.0422 mmHg, molecular weight=198)

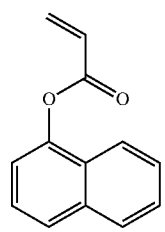

2-phenylphenoxyethyl acrylate (PhPhOEA, OP=2.57, boiling point=364.2° C., 80° C. vapor pressure=0.0006 mmHg, molecular weight=268.3)

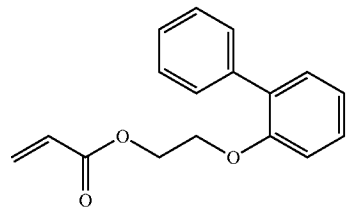 [SMILES: C=CC(=O)OCCOc1ccccc1-c1ccccc1]

1-naphthylmethyl acrylate (NalMA, OP=2.33, boiling point=342.1° C., 80° C. vapor pressure=0.042 mmHg, molecular weight=212.2)

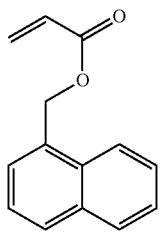 [SMILES: C=CC(=O)OCc1cccc2ccccc12]

2-naphthylmethyl acrylate (Na2MA, OP=2.33, boiling point=342.1° C., 80° C. vapor pressure=0.042 mmHg, molecular weight=212.2)

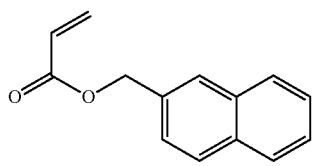 [SMILES: C=CC(=O)OCc1ccc2ccccc2c1]

DPhPA indicated by the formula below (OP=2.38, boiling point=354.5° C., 80° C. vapor pressure=0.0022 mmHg, molecular weight=266.3)

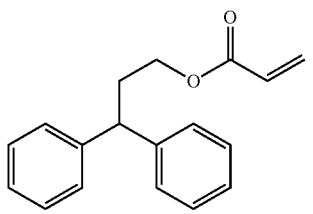 [SMILES: C=CC(=O)OCCC(c1ccccc1)c1ccccc1]

PhBzA indicated by the formula below (OP=2.29, boiling point=350.4° C., 80° C. vapor pressure=0.0022 mmHg, molecular weight=238.3)

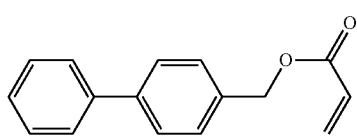 [SMILES: C=CC(=O)OCc1ccc(-c2ccccc2)cc1]

FLMA indicated by the formula below (OP=2.20, boiling point=349.3° C., 80° C. vapor pressure=0.0018 mmHg, molecular weight=250.3)

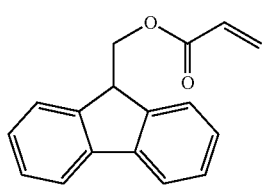 [SMILES: C=CC(=O)OCC1c2ccccc2-c2ccccc21]

ATMA indicated by the formula below (OP=2.13, boiling point=414.9° C., 80° C. vapor pressure=0.0001 mmHg, molecular weight=262.3)

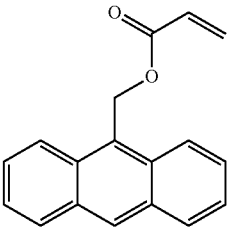 [SMILES: C=CC(=O)OCc1c2ccccc2cc2ccccc12]

DNaMA indicated by the formula below (OP=2.00, boiling point=489.4° C., 80° C. vapor pressure<0.0001 mmHg, molecular weight=338.4)

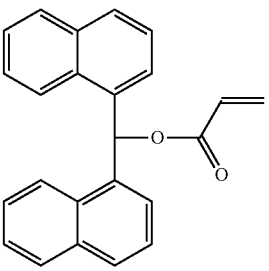 [SMILES: C=CC(=O)OC(c1cccc2ccccc12)c1cccc2ccccc12]

BPh44DA indicated by the formula below (OP=2.63, boiling point=444° C., 80° C. vapor pressure<0.0001 mmHg, molecular weight=322.3)

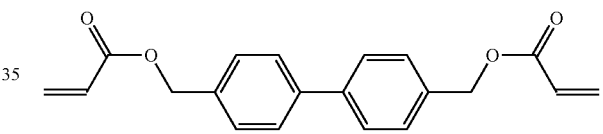

BPh43DA indicated by the formula below (OP=2.63, boiling point=439.5° C., 80° C. vapor pressure<0.0001 mmHg, molecular weight=322.3)

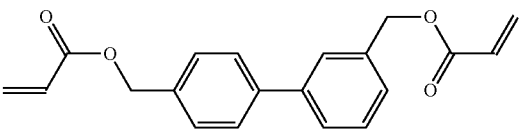 [SMILES: C=CC(=O)OCc1ccc(-c2cccc(COC(=O)C=C)c2)cc1]

DPhEDA indicated by the formula below (OP=2.63, boiling point=410° C., 80° C. vapor pressure<0.0001 mmEN, molecular weight=322.3)

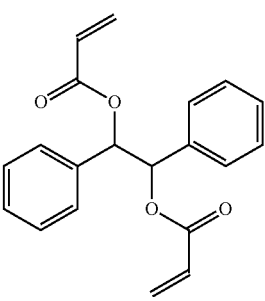 [SMILES: C=CC(=O)OC(c1ccccc1)C(OC(=O)C=C)c1ccccc1]

BPMDA indicated by the formula below (OP=2.68, boiling point=465.7° C., 80° C. vapor pressure<0.0001 mmHg, molecular weight=364.4)

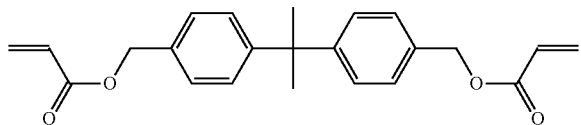 [SMILES: C=CC(=O)OCc1ccc(C(C)(C)c2ccc(COC(=O)C=C)cc2)cc1]

Na13MDA indicated by the formula below (OP=2.71, boiling point=438.8° C., 80° C. vapor pressure<0.0001 mmHg, molecular weight=296.3)

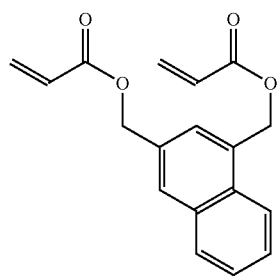 [SMILES: C=CC(=O)OCc1cc(COC(=O)C=C)c2ccccc2c1]

Formula (a-2-1) below (OP=2.40, boiling point=333.4° C., 80° C. vapor pressure=0.0181 mmHg, molecular weight=199.2)

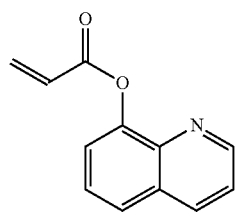

Formula (a-2-2) below (OP=2.40, boiling point=333.4° C., 80° C. vapor pressure=0.0181 mmHg, molecular weight=199.2)

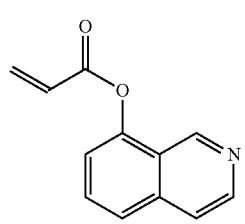

Formula (a-2-3) below (OP=1.86, boiling point=369.5° C., 80° C. vapor pressure=0.0053 mmHg, molecular weight=193.3)

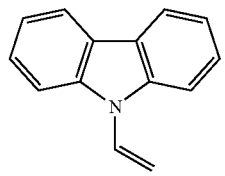

Formula (a-2-4) below (OP=2.85, boiling point=438.8° C., 80° C. vapor pressure<0.0001 mmHg, molecular weight=296.3)

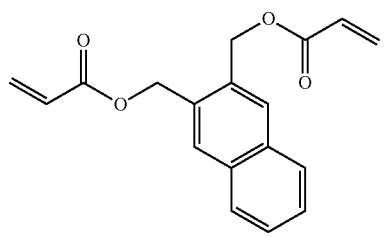 [SMILES: C=CC(=O)OCc1cc2ccccc2cc1COC(=O)C=C]

Formula (a-2-5) below (OP=2.71, boiling point=438.8° C., 80° C. vapor pressure<0.0001 mmHg, molecular weight=296.3)

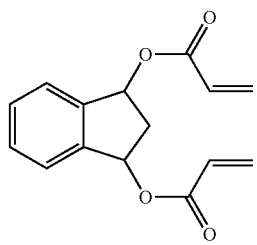 [SMILES: C=CC(=O)OC1CC(OC(=O)C=C)c2ccccc21]

Formula (a-2-6) below (OP=2.87, boiling point=421.0° C., 80° C. vapor pressure<0.0001 mmHg, molecular weight=338.4)

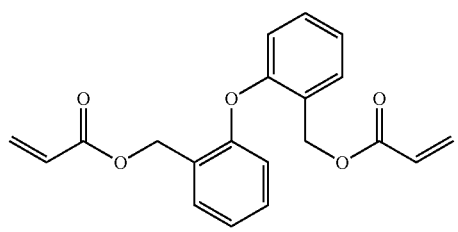 [SMILES: C=CC(=O)OCc1ccccc1Oc1ccccc1COC(=O)C=C]

Formula (a-2-7) below (OP=2.87, boiling point=465.2° C., 80° C. vapor pressure<0.0001 mmHg, molecular weight=338.4)

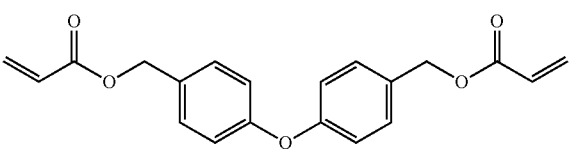 [SMILES: C=CC(=O)OCc1ccc(Oc2ccc(COC(=O)C=C)cc2)cc1]
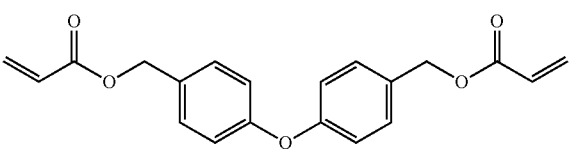 [SMILES: C=CC(=O)OCc1ccc(Oc2ccc(COC(=O)C=C)cc2)cc1]

Formula (a-2-8) below (OP=2.68, boiling point=465.7° C., 80° C. vapor pressure<0.0001 mmHg, molecular weight=364.4)

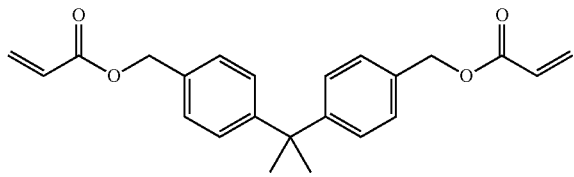 [SMILES: C=CC(=O)OCc1ccc(C(C)(C)c2ccc(COC(=O)C=C)cc2)cc1]

Formula (a-2-9) below (OP=2.50, boiling point=433.1° C., 80° C. vapor pressure<0.0001 mmHg, molecular weight=320.3)

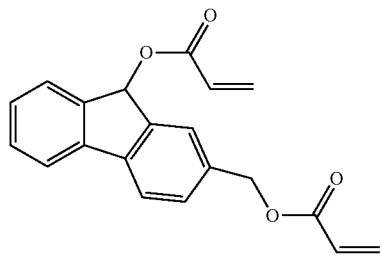 [SMILES: C=CC(=O)OCc1ccc2c(c1)C(OC(=O)C=C)c1ccccc1-2]

Formula (a-2-10) below (OP=2.64, boiling point=468.1° C., 80° C. vapor pressure<0.0001 mmHg, molecular weight=326.4)

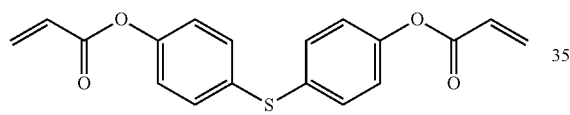

Formula (a-2-11) below (OP=3.25, boiling point=553.4° C., 80° C. vapor pressure<0.0001 mmHg, molecular weight=358.4)

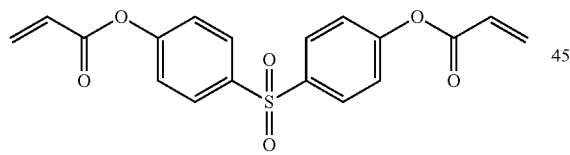

Formula (a-2-12) below (OP=2.63, boiling point=443.9° C., 80° C. vapor pressure<0.0001 mmHg, molecular weight=322.4)

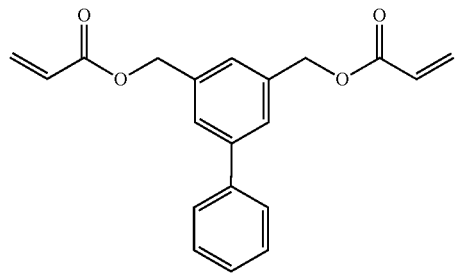 [SMILES: C=CC(=O)OCc1cc(COC(=O)C=C)cc(-c2ccccc2)c1]

Formula (a-2-13) below (OP=2.89, boiling point=509.3° C., 80° C. vapor pressure<0.0001 mmHg, molecular weight=406.4)

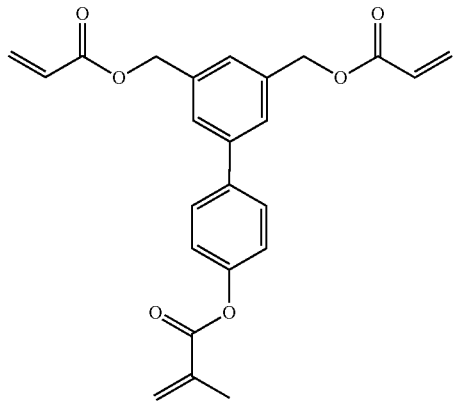 [SMILES: C=CC(=O)OCc1cc(COC(=O)C=C)cc(-c2ccc(OC(=O)C(=C)C)cc2)c1]

Formula (a-2-14) below (OP=2.63, boiling point=450.0° C., 80° C. vapor pressure<0.0001 mmHg, molecular weight=322.4)

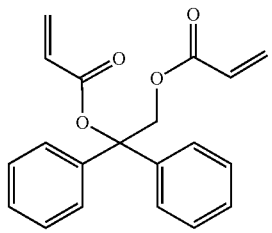 [SMILES: C=CC(=O)OCC(OC(=O)C=C)(c1ccccc1)c1ccccc1]

Formula (a-2-15) below (OP=3.00, boiling point=476.5° C., 80° C. vapor pressure<0.0001 mmHg, molecular weight=366.4)

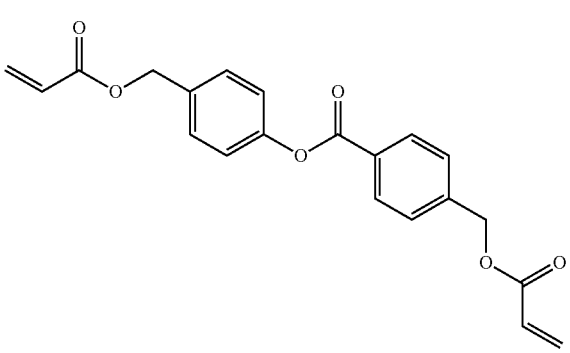 [SMILES: C=CC(=O)OCc1ccc(OC(=O)c2ccc(COC(=O)C=C)cc2)cc1]

Formula (a-2-16) below (OP=2.68, boiling point=447.4° C., 80° C. vapor pressure<0.0001 mmHg, molecular weight=364.4)

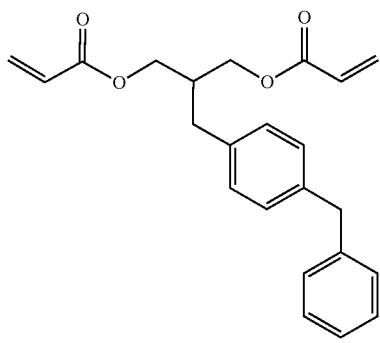 [SMILES: C=CC(=O)OCC(COC(=O)C=C)Cc1ccc(Cc2ccccc2)cc1]

Formula (a-2-17) below (OP=2.36, boiling point=543.8° C., 80° C. vapor pressure<0.0001 mmHg, molecular weight=398.5)

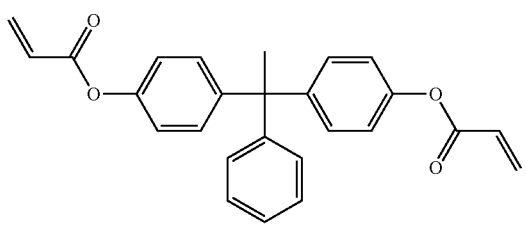 [SMILES: C=CC(=O)Oc1ccc(C(C)(c2ccccc2)c2ccc(OC(=O)C=C)cc2)cc1]

Formula (a-2-18) below (OP=3.27, boiling point=526.9° C., 80° C. vapor pressure<0.0001 mmHg, molecular weight=396.4)

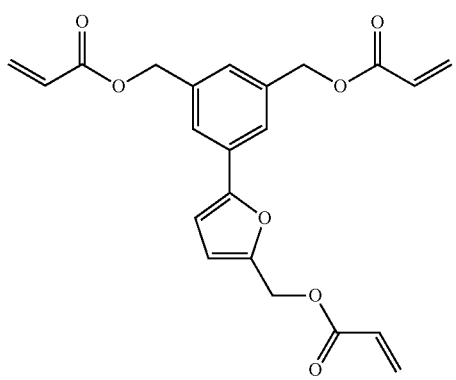 [SMILES: C=CC(=O)OCc1cc(COC(=O)C=C)cc(-c2ccc(COC(=O)C=C)o2)c1]

Formula (a-2-19) below (OP=2.71, boiling point=333.7° C., 80° C. vapor pressure=0.0302 mmHg, molecular weight=244.3)

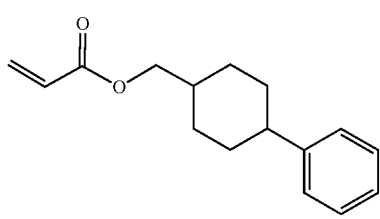 [SMILES: C=CC(=O)OCC1CCC(c2ccccc2)CC1]

Formula (a-2-20) below (OP=2.73, boiling point=333.7° C., 80° C. vapor pressure=0.0134 mmHg, molecular weight=258.3)

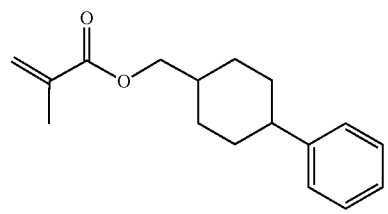 [SMILES: C=C(C)C(=O)OCC1CCC(c2ccccc2)CC1]

Formula (a-2-21) below (OP=2.71, boiling point=319.2° C., 80° C. vapor pressure=0.0566 mmHg, molecular weight=262.3)

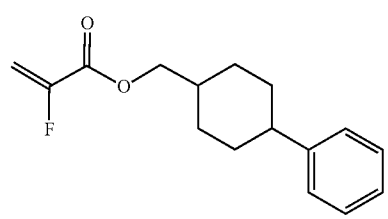 [SMILES: C=C(F)C(=O)OCC1CCC(c2ccccc2)CC1]

Formula (a-2-22) below (OP=2.71, boiling point=336.9° C., 80° C. vapor pressure=0.0055 mmHg, molecular weight=244.3)

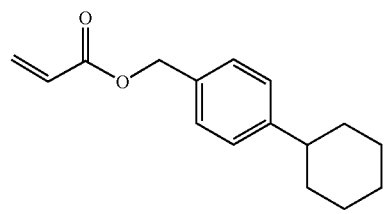 [SMILES: C=CC(=O)OCc1ccc(C2CCCCC2)cc1]

Formula (a-2-23) below (OP=3.00, boiling point=370.9° C., 80° C. vapor pressure=0.0021 mmHg, molecular weight=274.4)

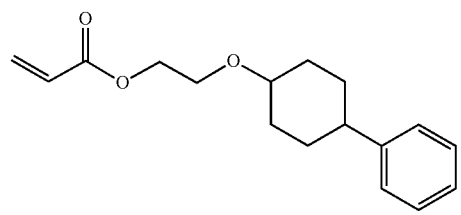 [SMILES: C=CC(=O)OCCOC1CCC(c2ccccc2)CC1]

Formula (a-2-24) below (OP=3.00, boiling point=376.4° C., 80° C. vapor pressure=0.0005 mmHg, molecular weight=274.4)

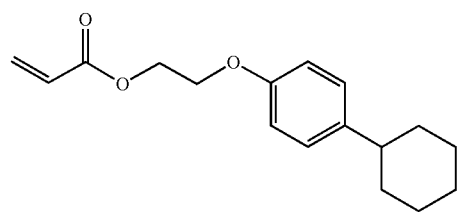 [SMILES: C=CC(=O)OCCOc1ccc(C2CCCCC2)cc1]

Formula (a-2-25) below (OP=3.00, boiling point=379.4° C., 80° C. vapor pressure=0.0002 mmHg, molecular weight=288.4)

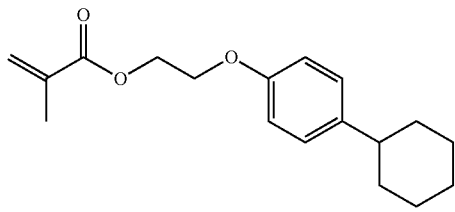 [SMILES: C=C(C)C(=O)OCCOc1ccc(C2CCCCC2)cc1]

Formula (a-2-26) below (OP=2.33, boiling point=360.8° C., 80° C. vapor pressure=0.0006 mmHg, molecular weight=252.3)

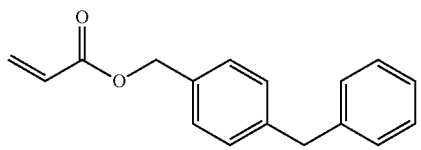 [SMILES: C=CC(=O)OCc1ccc(Cc2ccccc2)cc1]

Formula (a-2-27) below (OP=2.54, boiling point=371.5° C., 80° C. vapor pressure=0.0003 mmHg, molecular weight=254.3)

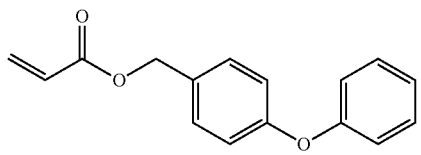 [SMILES: C=CC(=O)OCc1ccc(Oc2ccccc2)cc1]

Formula (a-2-28) below (OP=2.57, boiling point=381.2° C., 80° C. vapor pressure=0.0001 mmHg, molecular weight=268.3)

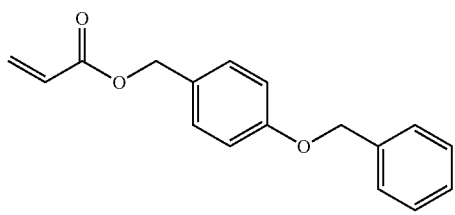 [SMILES: C=CC(=O)OCc1ccc(OCc2ccccc2)cc1]

Formula (a-2-29) below (OP=2.57, boiling point=381.8° C., 80° C. vapor pressure=0.0004 mmHg, molecular weight=268.3)

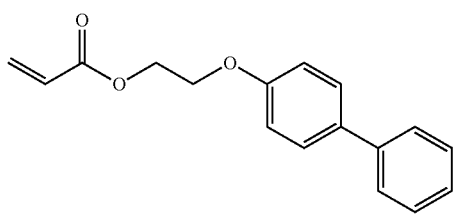 [SMILES: C=CC(=O)OCCOc1ccc(-c2ccccc2)cc1]

Formula (a-2-30) below (OP=2.50, boiling point=487.4° C., 80° C. vapor pressure<0.0001 mmHg, molecular weight=374.4)

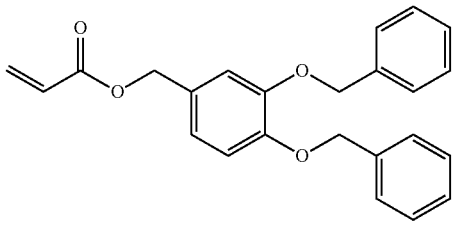 [SMILES: C=CC(=O)OCc1ccc(OCc2ccccc2)c(OCc2ccccc2)c1]

Formula (a-2-31) below (OP=2.67, boiling point=417.2° C., 80° C. vapor pressure<0.0001 mmHg, molecular weight=268.3)

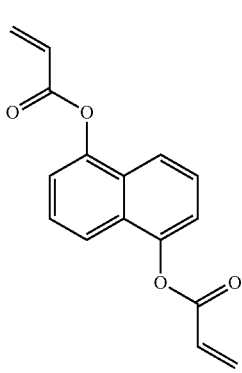 [SMILES: C=CC(=O)Oc1cccc2c(OC(=O)C=C)cccc12]

Formula (a-2-32) below (OP=2.67, boiling point=417.2° C., 80° C. vapor pressure 0.0001 mmHg, molecular weight=268.3)

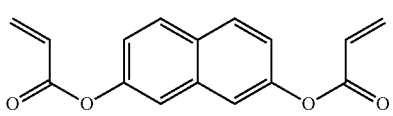 [SMILES: C=CC(=O)Oc1ccc2ccc(OC(=O)C=C)cc2c1]

Formula (a-2-33) below (OP=2.67, boiling point=417.2° C., 80° C. vapor pressure<0.0001 mmHg, molecular weight=268.3)

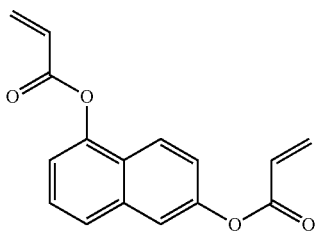 [SMILES: C=CC(=O)Oc1ccc2c(OC(=O)C=C)cccc2c1]

Formula (a-2-34) below (OP=2.67, boiling point=417.2° C., 80° C. vapor pressure<0.0001 mmHg, molecular weight=268.3)

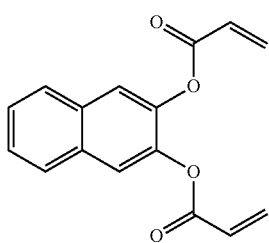 [SMILES: C=CC(=O)Oc1cc2ccccc2cc1OC(=O)C=C]

Formula (a-2-35) below (OP=2.71, boiling point=438.8° C., 80° C. vapor pressure<0.0001 mmHg, molecular weight=296.3)

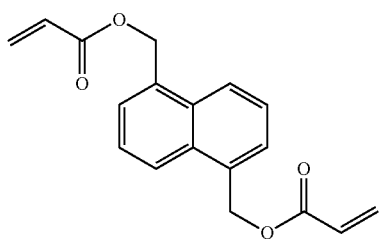 [SMILES: C=CC(=O)OCc1cccc2c(COC(=O)C=C)cccc12]

The blending ratio of the component (a) in the curable composition (A) is preferably 40 wt % or more and 99 wt % or less with respect to the sum of a component (b) (to be described later) and a component (c) (to be described later), that is, the total mass of all the components except the solvent (d). The blending ratio is more preferably 50 wt % or more and 95 wt % or less, and further preferably 60 wt % or more and 90 wt % or less. When the blending ratio of the component (a) is 40 wt % or more, the mechanical strength of the cured film of the curable composition increases. Also, when the blending ratio of the component (a) is 99 wt % or less, it is possible to increase the blending ratios of the components (b) and (c), and obtain characteristics such as a high photopolymerization rate.

A plurality of types of additive components that can be added as at least a part of the component (a) of the present invention can be polymers having a polymerizable functional group. A polymer like this preferably contains at least a cyclic structure such as an aromatic structure, an aromatic heterocyclic structure, or an alicyclic structure. For example, the polymer preferably contains at least one of constituent units represented by structures (1) to (6) below:

(1)

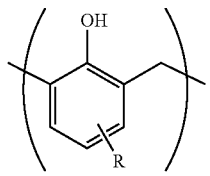

(2)

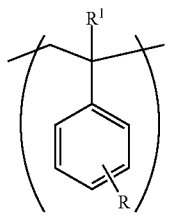

(3)

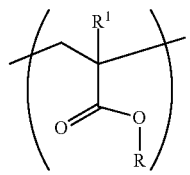

(4)

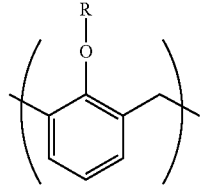

(5)

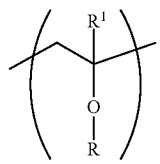

(6)

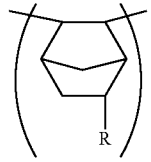

In the structures (1) to (6), a substituent group R is a substituent group containing partial structures each independently containing an aromatic ring, and $R^1$ is a hydrogen atom or a methyl group. In this specification, in constituent units represented by the structures (1) to (6), a portion other than R is the main chain of a specific polymer. The formula weight of the substituent group R is 80 or more, preferably 100 or more, more preferably 130 or more, and further preferably 150 or more. The upper limit of the formula weight of the substituent group R is practically 500 or less.

A polymer having a polymerizable functional group is normally a compound having a weight-average molecular weight of 500 or more. The weight-average molecular weight is preferably 1,000 or more, and more preferably 2,000 or more. The upper limit of the weight-average molecular weight is not particularly determined, but is preferably, for example, 50,000 or less. When the weight-average molecular weight is set at the above-described lower limit or more, it is possible to set the boiling point at 250° C. or more, and further improve the mechanical properties after curing. Also, when the weight-average molecular weight is set at the above-described upper limit or less, the solubility to the solvent increases, and the flowability of discretely arranged droplets is maintained because the viscosity is not too high. This makes it possible to further improve the flatness of the liquid film surface. Note that the weight-average molecular weight (Mw) in the present invention is a molecular weight measured by gel permeation chromatography (GPC).

Practical examples of the polymerizable functional group of the polymer are a (meth)acryloyl group, an epoxy group, an oxetane group, a methylol group, a methylol ether group, and a vinyl ether group. A (meth)acryloyl group is particularly favorable from the viewpoint of polymerization easiness.

When adding the polymer having the polymerizable functional group as at least a part of the component (a), the blending ratio can freely be set as long as the blending ratio falls within the range of the viscosity regulation to be described later. For example, the blending ratio to the total mass of all the components except for the solvent (d) is preferably 0.1 wt % or more and 60 wt % or less, more preferably 1 wt % or more and 50 wt % or less, and further preferably 10 wt % or more and 40 wt % or less. When the blending ratio of the polymer having the polymerizable functional group is set at 0.1 wt % or more, it is possible to improve the heat resistance, the dry etching resistance, the mechanical strength, and the low volatility. Also, when the blending ratio of the polymer having the polymerizable functional group is set at 60 wt % or less, it is possible to make the blending ratio fall within the range of the upper limit regulation of the viscosity (to be described later).

Component (b): Photopolymerization Initiator

The component (b) is a photopolymerization initiator. In this specification, the photopolymerization initiator is a compound that senses light having a predetermined wavelength and generates a polymerization factor (radical) described earlier. More specifically, the photopolymerization initiator is a polymerization initiator (radical generator) that generates a radical by light (infrared light, visible light, ultraviolet light, far-ultraviolet light, X-ray, a charged particle beam such as an electron beam, or radiation). The component (b) can be formed by only one type of a photopolymerization initiator, and can also be formed by a plurality of types of photopolymerization initiators.

Examples of the radical generator are as follows, but the radical generator is not limited to these examples.

2,4,5-triarylimidazole dimers that can have substituent groups, such as a 2-(o-chlorophenyl)-4,5-diphenylimidazole dimer, a 2-(o-chlorophenyl)-4,5-di(methoxyphenyl)imidazole dimer, a 2-(o-fluorophenyl)-4,5-diphenylimidazole dimer, and a 2-(o- or p-methoxyphenyl)-4,5-diphenylimidazole dimer; benzophenone derivatives such as benzophenone, N,N'-tetramethyl-4,4'-diaminobenzophenone (Michiler's ketone), N,N'-tetraethyl-4,4'-diaminobenzophenone, 4-methoxy-4'-dimethylaminobenzophenone, 4-chlorobenzophenone, 4,4'-dimethoxybenzophenone, and 4,4'-diaminobenzophenone; α-amino aromatic ketone derivatives such as 2-benzyl-2-dimethylamino-1-(4-morpholinophenyl)-butanone-1,2-methyl-1-[4-(methylthio)phenyl]-2-morpholino-propane-1-one; quinones such as 2-ethylanthraquinone, phenanthrenequinone, 2-t-butylanthraquinone, octamethylanthraquinone, 1,2-benzanthraquinone, 2,3-benzanthraquinone, 2-phenylanthraquinone, 2,3-diphenylamthraquinone, 1-chloroanthraquinone, 2-methylanthraquinone, 1,4-naphtoquinone, 9,10-phenanthraquinone, 2-methyl-1,4-naphtoquinone, and 2,3-dimethylanthraquinone; benzoin ether derivatives such as benzoin methyl ether, benzoin ethyl ether, and benzoin phenyl ether; benzoin derivatives such as benzoin, methyl benzoin, ethyl benzoin, and propyl benzoin; benzyl derivatives such as benzyldimethylketal; acridine derivatives such as 9-phenylacridine and 1,7-bis(9,9'-acrydinyl)heptane; N-phenylglycine derivatives such as N-phenylglycine; acetophenone derivatives such as acetophenone, 3-methylacetophenone, acetophenone benzylketal, 1-hydroxycylohexyl phenylketone, and 2,2-dimethoxy-2-phenyl acetophenone; thioxanthone derivatives such as thioxanthone, diethylthioxanthone, 2-isopropylthioxanthone, and 2-chlorothioxanthone; acylphosphine oxide derivatives such as 2,4,6-trimethylbenzoyldiphenylphosphine oxide, bis(2,4,6-trimethylbenzoyl)phenylphosphine oxide, and bis-(2,6-dimethoxybenzoyl)-2,4,4-trimethylpentylphosphine oxide; oxime ester derivatives such as 1,2-octanedione, 1-[4-(phenylthiol)-,2-(O-benzoyloxime)], ethanone, 1-[9-ethyl-6-(2-methylbenzoyl)-9H-carbazole-3-yl]-, and 1-(O-acetyloxime); and xanthone, fluorenone, benzaldehyde, fluorene, anthraquinone, triphenylamine, carbazole, 1-(4-isopropylphenyl)-2-hydroxy-2-methylprapane-1-one, and 2-hydroxy-2-methyl-1-phenylpropane-1-one.

Examples of commercially available products of the above-described radical generators are as follows, but the products are not limited to these examples.

Irgacure 184, 369, 651, 500, 819, 907, 784, and 2959, CGI-1700, -1750, and -1850, CG24-61, Darocur 1116 and 1173, Lucirin® TPO, LR8893, and LR8970 (manufactured by BASF), and Ubecryl P36 (manufactured by UCB).

Of the above-described radical generators, the component (b) is preferably an acylphosphine oxide-based polymerization initiator. Note that of the above-described radical generators, the acylphosphine oxide-based polymerization initiators are as follows.

Acylphosphine oxide compounds such as 2,4,6-trimethylbenzoyl diphenylphosphine oxide, bis(2,4,6-trimethylbenzoyl)phenylphosphine oxide, and bis(2,6-dimethoxybenzoyl)-2,4,4-trimethylpentylphosphine oxide.

The blending ratio of the component (b) in the curable composition (A) is preferably 0.1 wt % or more and 50 wt % or less with respect to the sum of the component (a), the component (b), and a component (c) (to be described later), that is, the total mass of all the components except for the solvent (d). Also, the blending ratio of the component (b) in the curable composition (A) is more preferably 0.1 wt % or more and 20 wt % or less, and further preferably 1 wt % or more and 20 wt % or less with respect to the total mass of all the components except for the solvent (d). When the blending ratio of the component (b) is set at 0.1 wt % or more, the curing rate of the composition increases, so the reaction efficiency can be improved. Also, when the blending ratio of the component (b) is set at 50 wt % or less, a cured film having mechanical strength to some extent can be obtained.

Component (c): Nonpolymerizable Compound

In addition to the components (a) and (b) described above, the curable composition (A) of the present invention can further contain a nonpolymerizable compound as the component (c) within a range that does not impair the effect of the present invention. An example of the component (c) is a compound that does not contain a polymerizable functional group such as a (meth)acryloyl group, and does not have the ability to sense light having a predetermined wavelength and generate the polymerization factor (radical) described previously. Examples of the nonpolymerizable compound are a sensitizer, a hydrogen donor, an internal mold release agent, an antioxidant, a polymer component, and other additives. The component (c) can contain a plurality of types of the above-described compounds.

The sensitizer is a compound that is properly added for the purpose of promoting the polymerization reaction and improving the reaction conversion rate. As the sensitizer, it is possible to use one type of a compound alone, or to use two or more types of compounds by mixing them.

An example of the sensitizer is a sensitizing dye. The sensitizing dye is a compound that is excited by absorbing light having a specific wavelength and has an interaction with a photopolymerization initiator as the component (b). The "interaction" herein mentioned is energy transfer or electron transfer from the sensitizing dye in the excited state to the photopolymerization initiator as the component (b).

Practical examples of the sensitizing dye are as follows, but the sensitizing dye is not limited to these examples.

An anthracene derivative, an anthraquinone derivative, a pyrene derivative, a perylene derivative, a carbazole derivative, a benzophenone derivative, a thioxanthone derivative, a xanthone derivative, a coumarin derivative, a phenothiazine derivative, a camphorquinone derivative, an acridinic dye, a thiopyrylium salt-based dye, a merocyanine-based dye, a quinoline-based dye, a styryl quinoline-based dye, a ketocoumarin-based dye, a thioxanthene-based dye, a xanthene-based dye, an oxonol-based dye, a cyanine-based dye, a rhodamine-based dye, and a pyrylium salt-based dye.

The hydrogen donor is a compound that reacts with an initiation radical generated from the photopolymerization initiator as the component (b) or a radical at a polymerization growth end, and generates a radical having higher reactivity. The hydrogen donor is preferably added when the photopolymerization initiator as the component (b) is a photo-radical generator.

Practical examples of the hydrogen donor as described above are as follows, but the hydrogen donor is not limited to these examples.

Amine compounds such as n-butylamine, di-n-butylamine, tri-n-butylphosphine, allylthiourea, s-benzylisothiuronium-p-toluenesulfinate, triethylamine, diethylaminoethyl methacrylate, triethylenetetramine, 4,4'-bis(dialkylamino) benzophenone, N,N-dimethylamino ethylester benzoate, N,N-dimethylamino isoamylester benzoate, pentyl-4-dimethylamino benzoate, triethanolamine, and N-phenylglycine; and mercapto compounds such as 2-mercapto-N-phenylbenzoimidazole and mercapto propionate ester.

It is possible to use one type of a hydrogen donor alone, or to use two or more types of hydrogen donors by mixing them. The hydrogen donor can also have a function as a sensitizer.

An internal mold release agent can be added to the curable composition for the purpose of reducing the interface bonding force between a mold and the curable composition, that is, reducing the mold release force in a mold release step (to be described later). In this specification, "internal" means that the mold release agent is added to the curable composition in advance before a curable composition arranging step. As the internal mold release agent, it is possible to use surfactants such as a silicon-based surfactant, a fluorine-based surfactant, and a hydrocarbon-based surfactant. In the present invention, however, the addition amount of the fluorine-based surfactant is limited as will be described later. Note that the internal mold release agent according to the present invention is not polymerizable. It is possible to use one type of an internal mold release agent alone, or to use two or more types of internal mold release agents by mixing them.

The fluorine-based surfactant includes the following.

A polyalkylene oxide (for example, polyethylene oxide or polypropylene oxide) adduct of alcohol having a perfluoroalkyl group, and a polyalkylene oxide (for example, polyethylene oxide or polypropylene oxide) adduct of perfluoropolyether.

Note that the fluorine-based surfactant can have a hydroxyl group, an alkoxy group, an alkyl group, an amino group, or a thiol group in a portion (for example, a terminal group) of the molecular structure. An example is pentadecaethyleneglycol mono1H,1H,2H,2H-perfluorooctylether.

It is also possible to use a commercially available product as the fluorine-based surfactant. Examples of the commercially available product of the fluorine-based surfactant are as follows.

MEGAFACE® F-444, TF-2066, TF-2067, and TF-2068, and DEO-15 (abbreviation) (manufactured by DIC); Fluorad FC-430 and FC-431 (manufactured by Sumitomo 3M); Surfton® S-382 (manufactured by AGC); EFTOP EF-122A, 122B, 122C, EF-121, EF-126, EF-127, and MF-100 (manufactured by Tochem Products); PF-636, PF-6320, PF-656, and PF-6520 (manufactured by OMNOVA Solutions); UNIDYNE® DS-401, DS-403, and DS-451 (manufactured by DAIKIN); and FUTAGENT® 250, 251, 222F, and 208G (manufactured by NEOS).

The internal mold release agent can also be a hydrocarbon-based surfactant. The hydrocarbon-based surfactant includes an alkyl alcohol polyalkylene oxide adduct obtained by adding alkylene oxide having a carbon number of 2 to 4 to alkyl alcohol having a carbon number of 1 to 50, and polyalkylene oxide.

Examples of the alkyl alcohol polyalkylene oxide adduct are as follows.

A methyl alcohol ethylene oxide adduct, a decyl alcohol ethylene oxide adduct, a lauryl alcohol ethylene oxide adduct, a cetyl alcohol ethylene oxide adduct, a stearyl alcohol ethylene oxide adduct, and a stearyl alcohol ethylene oxide/propylene oxide adduct.

Note that the terminal group of the alkyl alcohol polyalkylene oxide adduct is not limited to a hydroxyl group that can be manufactured by simply adding polyalkylene oxide to alkyl alcohol. This hydroxyl group can also be substituted by a polar functional group such as a carboxyl group, an amino group, a pyridyl group, a thiol group, or a silanol group, or by a hydrophobic group such as an alkyl group or an alkoxy group.

Examples of polyalkylene oxide are as follows.

Polyethylene glycol, polypropylene glycol, their mono or dimethyl ether, mono or dioctyl ether, mono or dinonyl ether, and mono or didecyl ether, monoadipate, monooleate, monostearate, and monosuccinate.

A commercially available product can also be used as the alkyl alcohol polyalkylene oxide adduct. Examples of the commercially available product of the alkyl alcohol polyalkylene oxide adduct are as follows.

Polyoxyethylene methyl ether (a methyl alcohol ethylene oxide adduct) (BLAUNON MP-400, MP-550, and MP-1000) manufactured by AOKI OIL INDUSTRIAL, polyoxyethylene decyl ether (a decyl alcohol ethylene oxide adduct) (FINESURF D-1303, D-1305, D-1307, and D-1310) manufactured by AOKI OIL INDUSTRIAL, polyoxyethylene lauryl ether (a lauryl alcohol ethylene oxide adduct) (BLAUNON EL-1505) manufactured by AOKI OIL INDUSTRIAL, polyoxyethylene cetyl ether (a cetyl alcohol ethylene oxide adduct) (BLAUNON CH-305 and CH-310) manufactured by AOKI OIL INDUSTRIAL, polyoxyethylene stearyl ether (a stearyl alcohol ethylene oxide adduct) (BLAUNON SR-705, SR-707, SR-715, SR-720, SR-730, and SR-750) manufactured by AOKI OIL INDUSTRIAL, randomly polymerized polyoxyethylene polyoxypropylene stearyl ether (BLAUNON SA-50/50 1000R and SA-30/70 2000R) manufactured by AOKI OIL INDUSTRIAL, polyoxyethylene methyl ether (Pluriol® A760E) manufactured by BASF, and polyoxyethylene alkyl ether (EMULGEN series) manufactured by KAO.

A commercially available product can also be used as polyalkylene oxide. An example is an ethylene oxide/propylene oxide copolymer (Pluronic PE6400) manufactured by BASF.

The fluorine-based surfactant shows an excellent mold release force reducing effect and hence is effective as an internal mold release agent. The blending ratio of the component (c) except for the fluorine-based surfactant in the curable composition (A) is preferably 0 wt % or more and 50 wt % or less with respect to the sum of the components (a), (b), and (c), that is, the total mass of all the components except for the solvent (d). The blending ratio of the component (c) except for the fluorine-based surfactant in the curable composition (A) is more preferably 0.1 wt % or more and 50 wt % or less, and further preferably 0.1 wt % or more and 20 wt % or less with respect to the total mass of all the components except for the solvent (d). When the blending ratio of the component (c) except for the fluorine-based surfactant is set at 50 wt % or less, a cured film having mechanical strength to some extent can be obtained.

Component (d): Solvent

The curable composition of the present invention contains a solvent having a boiling point of 80° C. or more and less than 250° C. at normal pressure as the component (d). The component (d) is a solvent that dissolves the components (a), (b), and (c). Examples are an alcohol-based solvent, a ketone-based solvent, an ether-based solvent, and a nitrogen-containing solvent. As the component (d), it is possible to use one type of a component alone, or to use two or more types of components by combining them. The boiling point at normal pressure of the component (d) is 80° C. or more, preferably 140° C. or more, and particularly preferably 150° C. or more. The boiling point at normal pressure of the component (d) is less than 250° C., and preferably 200° C. or less. Accordingly, the boiling point at normal pressure of the component (d) is preferably 80° C. or more and less than 200° C. If the boiling point of the component (d) at normal pressure is less than 80° C., the volatilization rate in a waiting step (to be described later) is too high, so it is possible that the component (d) volatilizes before droplets of the curable composition (A) combine with each other, so the droplets of the curable composition (A) do not combine. Also, if the boiling point at normal pressure of the component (d) is 250° C. or more, it is possible that the volatilization of the solvent (d) is insufficient in the waiting step (to be described later), so the component (d) remains in the cured product of the curable composition (A).

Examples of the alcohol-based solvent are as follows.

Monoalcohol-based solvents such as methanol, ethanol, n-propanol, iso-propanol, n-butanol, iso-butanol, sec-butanol, tert-butanol, n-pentanol, iso-pentanol, 2-methylbutanol, sec-pentanol, tert-pentanol, 3-methoxybutanol, n-hexanol, 2-methylpentanol, sec-hexanol, 2-ethylbutanol, sec-heptanol, 3-heptanol, n-octanol, 2-ethylhexanol, sec-octanol, n-nonyl alcohol, 2,6-dimethylheptanol-4, n-decanol, sec-undecyl alcohol, trimethylnonyl alcohol, sec-tetradecyl alcohol, sec-heptadecyl alcohol, phenol, cyclohexanol, methylcyclohexanol, 3,3,5-trimethylcyclohexanol, benzyl alcohol, phenylmethylcarbinol, diacetone alcohol, and cresol; and polyalcohol-based solvents such as ethylene glycol, 1,2-prpylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, triethylene glycol, tripropylene glycol, and glycerin.

Examples of the ketone-based solvent are as follows.

Acetone, methylethylketone, methyl-n-propylketone, methyl-n-butyketone, diethylketone, methyl-iso-butylketone, methyl-n-pentylketone, ethyl-n-butylketone, methyl-n-hexylketone, di-iso-butylketone, trimethylnonanon, cyclohexanone, methylcyclohexanone, 2,4-pentanedione, acetonylacetone, diacetone alcohol, acetophenone, and fenthion.

Examples of the ether-based solvent are as follows.

Ethyl ether, iso-propyl ether, n-butyl ether, n-hexyl ether, 2-ethylhexyl ether, ethylene oxide, 1,2-propylene oxide, dioxolane, 4-methyldioxolane, dioxane, dimethyldioxane, 2-methoxyethanol, 2-ethoxyethanol, ethylene glycol diethyl ether, 2-n-butoxyethanol, 2-n-hexoxyethanol, 2-phenoxyethanol, 2-(2-ethylbutoxy)ethanol, ethylene glycol dibutyl ether, diethylene glycol monomethyl ether, diethylene glycol monoethyl ether, diethylene glycol diethyl ether, diethylene glycol mono-n-butyl ether, diethylene glycol di-n-butyl ether, diethylene glycol mono-n-hexyl ether, ethoxy triglycol, tetraethylene glycol di-n-butyl ether, 1-n-butoxy-2-propanol, 1-phenoxy-2-propanol, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, tripropylene glycol monomethyl ether, tetrahydrofuran, and 2-methyltetrahydrofuran.

Examples of the ester-based solvent are as follows.

Diethyl carbonate, methyl acetate, ethyl acetate, amyl acetate, γ-butyrolactone, γ-valerolactone, n-propyl acetate, iso-propyl acetate, n-butyl acetate, iso-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxy triglycol acetate, ethyl propionate, n-butyl propionate, iso-amyl propionate, diethyl oxalate, di-n-butyl oxalate, methyl lactate, ethyl lactate, n-butyl lactate, n-amyl lactate, diethyl malonate, dimethyl phthalate, and diethyl phthalate.

Examples of the nitrogen-containing solvent are as follows.

N-methylformamide, N,N-dimethylformamide, N,N-diethylformamide, acetoamide, N-methylacetoamide, N,N-dimethylacetoamide, N-methylpropionamide, and N-methylpyrrolidone.

Of the above-described solvents, the ether-based solvent and the ester-based solvent are favorable. Note that an ether-based solvent and an ester-based solvent each having a glycol structure are more favorable from the viewpoint of good film formation properties.

Further favorable examples are as follows.

Propylene glycol monomethyl ether, propylene glycol monoethyl ether, propylene glycol monopropyl ether, propylene glycol monomethyl ether acetate, propylene glycol monoethyl ether acetate, and propylene glycol monopropyl ether acetate.

A particularly favorable example is propylene glycol monomethyl ether acetate. Note that ethyl)isocyanurate di(meth)acrylate is also favorable.

In the present invention, a favorable solvent is a solvent having at least one of an ester structure, a ketone structure, a hydroxyl group, and an ether structure. More specifically, a favorable solvent is one solvent or a solvent mixture selected from propylene glycol monomethyl ether acetate (boiling point=146° C.), propylene glycol monomethyl ether, cyclohexanone, 2-haptanone, γ-butyrolactone, and ethyl lactate.

In the present invention, a polymerizable compound having a boiling point of 80° C. or more and less than 250° C. at normal pressure is also usable as the component (d). Examples of the polymerizable compound having a boiling point of 80° C. or more and less than 250° C. at normal pressure are as follows.

Cyclohexyl acrylate (198° C.), benzyl acrylate (229° C.), isobornyl acrylate (245° C.), tetrahydrofurfuryl acrylate (202° C.), trimethylcyclohexyl acrylate (232° C.), isooctyl acrylate (217° C.), n-octyl acrylate (228° C.), ethoxyethoxyethyl acrylate (boiling point=230° C.), divinylbenzene (193° C.), 1,3-diisopropenylbenzene (218° C.), styrene (145° C.), and α-methylstyrene (165° C.).

In the present invention, when the whole of the curable composition (A) is 100 vol %, the content of the solvent (d) is 5 vol % or more and 95 vol % or less, preferably 30 vol % or more and 85 vol % or less, and further preferably 70 vol % or more and 80 vol % or less. If the content of the solvent (d) is smaller than 5 vol %, no thin film can be obtained after the solvent (d) volatilized even under the condition that a practically continuous liquid film can be obtained. On the other hand, if the content of the solvent (d) is larger than 95 vol %, no thick film can be obtained after the solvent (d) volatilized even when droplets are closely dropped (arranged) by an inkjet method.

Temperature When Blending Curable Composition

When preparing the curable composition (A) of the present invention, at least the components (a), (b), and (d) are mixed and dissolved under a predetermined temperature condition. More specifically, the predetermined temperature condition is 0° C. or more and 100° C. or less. Note that the same applies to a case in which the curable composition (A) contains the component (c).

Viscosity of Curable Component

The curable composition (A) of the present invention is a liquid. This is so because droplets of the curable composition (A) are discretely dropped on a substrate by an inkjet method in an arranging step (to be described later). At 23° C., the viscosity of the curable composition (A) of the present invention is 2 mPa·s or more and 60 mPa·s or less, preferably 5 mPa·s or more and 30 mPa·s or less, and more preferably 5 mPa·s or more and 15 mPa·s or less. If the viscosity of the curable composition (A) is smaller than 2 mPa·s, the discharge property of droplets by an inkjet method becomes unstable. Also, if the viscosity of the curable composition (A) is larger than 60 mPa·s, it is impossible to form droplets having a volume of about 1.0 to 3.0 pL favorable in the present invention.

The viscosity at 23° C. in a state in which the solvent (d) volatilized from the curable composition (A), that is, the viscosity at 23° C. of a mixture of components except for the solvent (d) of the curable composition (A) is 30 mPa·s or more and 10,000 mPa·s or less. The viscosity at 23° C. of the mixture of components except for the solvent (d) of the curable composition (A) is preferably 90 mPa·s or more and 2,000 mPa·s or less, for example, 120 mPa·s or more and 1,000 mPa·s or less, and more preferably 150 mPa·s or more and 500 mPa·s or less. When the viscosity of the components except for the solvent (d) of the curable composition (A) is set to 1,000 mP·s or less, spreading and filling are rapidly completed when bringing the curable composition (A) into contact with a mold. Accordingly, the use of the curable composition (A) of the present invention makes it possible to perform an imprinting process at high throughput, and suppress pattern defects caused by insufficient filling. Also, when the viscosity of components except for the solvent (d) of the curable composition (A) is set to 1 mPa·s or more, it is possible to prevent an unnecessary flow of droplets of the curable composition (A) after the solvent (d) volatilized. Furthermore, when bringing the curable composition (A) into contact with a mold, the curable composition (A) does not easily flow out from the end portions of the mold.

Surface Tension of Curable Composition

The surface tension of the curable composition (A) of the present invention is as follows. The surface tension at 23° C. of the composition containing the components except for the solvent (component (d)) is preferably 5 mN/m or more and 70 mN/m or less. The surface tension at 23° C. of the composition containing the components except for the solvent (component (d)) is more preferably 7 mN/m or more and 50 mN/m or less, and further preferably 10 mN/m or more and 40 mN/m or less. Note that when the surface tension is high, for example, 5 mN/m or more, the capillarity strongly acts, so filling (spreading and filling) is complete within a short time period when the curable composition (A) and a mold are brought into contact with each other. Also, when the surface tension is 70 mN/m or less, a cured film obtained by curing the curable composition has surface smoothness.

Contact Angle of Curable Composition

The contact angle of the curable composition (A) of the present invention is as follows. That is, the contact angle of the composition containing the components except for the solvent (component (d)) is preferably 0° or more and 90° or less and particularly preferably 0° or more and 10° or less with respect to both the surface of a substrate and the surface of a mold. If the contact angle is larger than 90°, the capillarity acts in a negative direction (a direction in which the contact interface between the mold and the curable composition is shrunk) inside a pattern of the mold or in a gap between the substrate and the mold, and this may make filling impossible. When the contact angle is small, the capillarity strongly acts, and the filling rate increases.

Impurities Mixed in Curable Composition

The curable composition (A) of the present invention preferably contains impurities as little as possible. Note that impurities mean components other than the components (a), (b), (c), and (d) described above. Therefore, the curable composition (A) of the present invention is favorably a composition obtained through a refining step. A refining step like this is preferably filtration using a filter.

As this filtration using a filter, it is favorable to mix the components (a), (b), and (c) described above, and filtrate the mixture by using, for example, a filter having a pore diameter of 0.001 μm or more and 5.0 μm or less. When performing filtration using a filter, is it further favorable to perform the filtration in multiple stages, or to repetitively perform the filtration a plurality of times (cycle filtration). It is also possible to re-filtrate a liquid once filtrated through a filter, or perform filtration by using filters having different pore diameters. Examples of the filter for use in filtration are filters made of, for example, a polyethylene resin, a polypropylene resin, a fluorine resin, and a nylon resin, but the filter is not particularly limited. Impurities such as particles mixed in the curable composition can be removed through the refining step as described above. Consequently, it is possible to prevent impurities mixed in the curable composition from causing pattern defects by forming unexpected unevenness on a cured film obtained after the curable composition is cured.

Note that when using the curable composition of the present invention in order to fabricate a semiconductor integrated circuit, it is favorable to avoid mixing of impurities (metal impurities) containing metal atoms in the curable composition as much as possible so as not to obstruct the operation of a product. The concentration of the metal impurities contained in the curable composition is preferably 10 ppm or less, and more preferably 100 ppb or less.

Glass Transition Temperature of Cured Curable Composition

When the glass transition temperature is sufficiently higher than the temperature of mold release, a cured product shows a strong glass state, that is, a high mechanical strength during mold release, so pattern collapse or break hardly occurs due to impact of mold release. When performing the mold release step at room temperature, therefore, the glass transition temperature of the cured product is preferably 70° C. or more, more preferably 100° C. or more, and further preferably 150° C. or more.

The glass transition temperature of the cured product can be measured by using differential scanning calorimetry (DSC) or a dynamic viscoelasticity apparatus.

Measurement using DSC will be explained below. In this case, an extrapolated glass transition onset temperature (Tig) is obtained from the intersection of a straight line formed by extending the baseline on the low-temperature side of a DSC curve of a cured product to the high-temperature side, and a tangent at a point at which the slope of a curve of a steplike changing portion of glass transition is maximum. The baseline on the low-temperature side is a DSC curve portion in a temperature region in which neither transition nor reaction occurs in a specimen. The extrapolated glass transition onset temperature (Tig) is regarded as the glass transition temperature of the cured product. An example of the apparatus is STA-6000 (manufactured by Perkin Elmer).

On the other hand, measurement using the dynamic viscoelasticity apparatus is as follows. In this case, a temperature at which the loss tangent (tan δ) of the cured product is maximum is defined as the glass transition temperature. An example of an apparatus capable of measuring the dynamic viscoelasticity is MCR301 (manufactured by Anton Paar).

Heat Resistance of Cured Curable Composition

The heat resistance of a cured curable composition can be measured by using thermogravimetric analysis (TGA) or the like.

When performing measurement by using TGA, for example, a cured curable composition is placed in a nitrogen atmosphere at a flow rate of 5 L/hr to 6 L/hr, and the thermogravimetry reduction rate is measured when the temperature is raised to n° C. at a heating rate of 20° C./min. This shows that the product has a heat resistance to n° C. An example of the apparatus is STA 1000 (manufactured by Linseis).

As the heat resistance of a cured product, a temperature at which the thermogravimetry reduction ratio reaches 2% for the first time when the temperature is raised from 260° C. at a heating rate of 20° C./min is preferably 350° C. or more, more preferably 400° C. or more, and further preferably 450° C. or more.

Substrate

In this specification, a member on which droplets of the curable composition (A) are discretely dropped (arranged) is explained as a substrate.

This substrate is a substrate to be processed, and a silicon wafer is normally used. The substrate can have a layer to be processed on the surface. On the substrate, another layer can also be formed below the layer to be processed. When a quartz substrate is used as the substrate, a replica (replica mold) of a mold for imprinting can be manufactured. However, the substrate is not limited to a silicon wafer or a quartz substrate. The substrate can freely be selected from those known as semiconductor device substrates such as aluminum, a titanium-tungsten alloy, an aluminum-silicon alloy, an aluminum-copper-silicon alloy, silicon oxide, and silicon nitride. Note that the surface of the substrate or of the layer to be processed is preferably treated by a surface treatment such as a silane coupling treatment, a silazane treatment, or deposition of an organic thin film, thereby improving the adhesion to the curable composition (A). As a practical example of the organic thin film to be deposited as the surface treatment, an adhesive layer described in Japanese Patent Laid-Open No. 2009-503139 can be used.

A film forming method of the present invention can be performed as a method of forming a film having a pattern, that is, as a pattern forming method, and can also be performed as a method of forming a film (for example, a planarization film) having no pattern, that is, as a planarization film forming method.

Pattern Forming Method

The pattern forming method of the present invention will be explained below with reference to FIGS. 1A to 1G. When performing the film forming method of the present invention as the pattern forming method, the cured film is preferably a film having a pattern with a size of 1 nm or more and 10 mm or less, and more preferably a film having a pattern with a size of 10 nm or more and 100 μm or less. Generally, a film forming method of forming a film having a pattern (uneven structure) of a nano size (1 nm or more and 100 nm or less) by using light is called a photoimprint method. The film forming method of the present invention forms a film of a curable composition in a space between a mold and a substrate by using the photoimprint method. However, the curable composition can also be cured by another energy (for example, heat or an electromagnetic wave).

An example in which the film forming method of the present invention is applied to the pattern forming method will be explained below. The pattern forming method includes, for example, a forming step, an arranging step, a waiting step, a contact step, a curing step, and a mold release step. The forming step is a step of forming an underlayer. The arranging step is a step of discretely arranging droplets of the curable composition (A) on the underlayer. The waiting step is a step of waiting until the droplets of the curable composition (A) combine with each other and the solvent (d) volatilizes. The contact step is a step of bringing the curable composition (A) and a mold in contact with each other. The curing step is a step of curing the curable composition (A). The mold release step is a step of releasing the mold from the cured film of the curable composition (A). The arranging step is performed after the forming step, the waiting step is performed after the arranging step, the contact step is performed after the waiting step, the curing step is performed after the contact step, and the mold release step is performed after the curing step.

Arranging Step

In the arranging step as schematically shown in FIG. 1A, droplets 102 of the curable composition (A) are discretely arranged on a substrate 101. A substrate on which an underlayer is stacked can also be used as the substrate 101. In addition, the adhesion of the surface of the substrate 101 with respect to the curable composition (A) can be improved by a surface treatment such as a silane coupling treatment, a silazane treatment, or deposition of an organic thin film.

An inkjet method is particularly favorable as the arranging method of arranging the droplets 102 of the curable composition (A) on the substrate. It is favorable to arrange the droplets 102 of the curable composition (A) densely on that region of the substrate 101, which faces a region in which recesses forming the pattern of a mold 106 densely exist, and sparsely on that region of the substrate 101, which faces a region in which projections forming the pattern of the mold 106 sparsely exist. Consequently, a film (residual film) 109 (to be described later) of the curable composition (A) formed on the substrate 101 is controlled to have a uniform thickness regardless of the sparsity and density of the pattern of the mold 106.

An index called an average residual liquid film thickness is defined in order to prescribe the volume of the curable composition (A) to be arranged. The average residual liquid film thickness is a value obtained by dividing the volume of the curable composition (A) (except the solvent (d)) to be arranged in the arranging step by the area of a film formation region of the mold. The volume of the curable composition (A) (except the solvent (d)) is the sum total of the volumes of the individual droplets of the curable composition (A) after the solvent (d) volatilized. According to this definition, the average residual liquid film thickness can be prescribed regardless of the state of unevenness even when the substrate surface is uneven.

Waiting Step

Figure 1B:
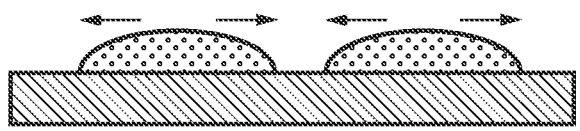

In the present invention, the waiting step is provided after the arranging step and the contact step. In this step, a value obtained by dividing the total volume of the droplets of the curable composition (A) dropped in one-time pattern formation by the total area of regions (pattern formation regions) in which patterns are formed in one-time pattern formation is defined as an average initial liquid film thickness. In the waiting step as schematically shown in FIG. 1B, the droplets 102 of the curable composition (A) spread on the substrate 101. Consequently, the whole pattern formation region of the substrate 101 is covered with the curable composition (A).

Figure 1C:
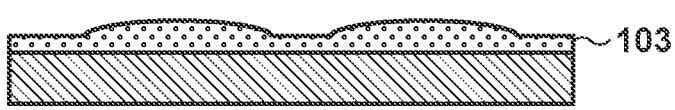

As schematically shown in FIG. 1C, the present inventors confirmed that when the average initial liquid film thickness is 80 nm or more, the droplets of the curable composition (A) combine with each other on the substrate and form a practically continuous liquid film 103. The present inventors also confirmed that the surface of the liquid film is planarized when the average initial liquid film thickness is 89 nm or more. A liquid film having an average initial liquid film thickness of 80 nm or more can be obtained by arranging the droplets of the curable composition (A) having a volume of 1.0 pL or more at a density of 80 droplets/mm$^2$ or more. Likewise, a liquid film having an average initial liquid film thickness of 89 nm can be obtained by arranging the droplets of the curable composition (A) having a volume of 1.0 pL or more at a density of 89 droplets/mm$^2$ or more.

A flow behavior during the waiting step of the droplets of the curable composition (A) arranged on the substrate will be explained with reference to FIGS. 2A to 2D. The droplets of the curable composition (A) are discretely arranged on the substrate as shown in FIG. 2A, and each droplet gradually spreads on the substrate as shown in FIG. 2B. Then, the droplets of the curable composition (A) on the substrate begin combining with each other to form a liquid film as shown in FIG. 2C, and a continuous liquid film is formed (the surface of the substrate is covered with the curable composition (A) and there is no more exposed surface) as shown in FIG. 2D. The state of the curable composition (A) as shown in FIG. 2D is called "a practically continuous liquid film".

Figure 1D:
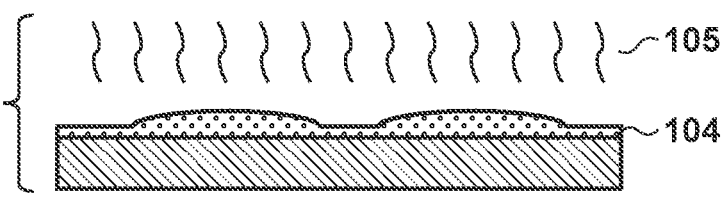

In addition, as schematically shown in FIG. 1D, the solvent (d) 105 contained in the liquid film 104 is volatilized in the waiting step. Assuming that the total weight of the components except for the solvent (d) is 100 vol %, the residual amount of the solvent (d) in the liquid film 104 after the waiting step is preferably 10 vol % or less. If the residual amount of the solvent (d) is larger than 10 vol %, the mechanical properties of the cured film may deteriorate.

In the waiting step, it is possible to perform a baking step of heating the substrate 101 and the curable composition (A), or ventilate the atmospheric gas around the substrate 101, for the purpose of accelerating the volatilization of the solvent (d). Heating is performed at, for example, 30° C. or more and 200° C. or less, preferably 80° C. or more and 150° C. or less, and particularly preferably 90° C. or more and 110° C. or less. The heating time can be 10 sec or more and 600 sec or less. The baking step can be performed by using a known heater such as a hotplate or an oven.

The waiting step is, for example, 0.1 to 600 sec, and preferably 10 to 300 sec. If the waiting step is shorter than 0.1 sec, the combination of the droplets of the curable composition (A) becomes insufficient, so no practically continuous liquid film is formed. If the waiting step exceeds 600 sec, the productivity decreases. To suppress the decrease in productivity, therefore, it is also possible to sequentially move substrates completely processed in the arranging step to the waiting step, perform the waiting step in parallel to a plurality of substrates, and sequentially move the substrates completely processed in the waiting step to the contact step. Note that in the related art, a few thousands of seconds to a few tens of thousands of seconds are theoretically required before a practically continuous liquid film is formed. In practice, however, no continuous liquid film can be formed because the spread of the droplets of the curable composition stagnates due to the influence of volatilization.

When the solvent (d) volatilizes in the waiting step, the practically continuous liquid film 104 containing the components (a), (b), and (c) remains. The average residual liquid film thickness of the practically continuous liquid film 104 from which the solvent (d) volatilized (was removed) becomes smaller than the liquid film 103 by the volatilized amount of the solvent (d). A state in which the entire pattern formation region of the substrate 101 is covered with the practically continuous liquid film 104 of the curable composition (A) from which the solvent (d) was removed is maintained in the entire region.

Contact Step

Figure 1E:
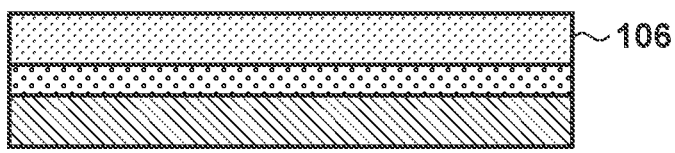

In the contact step as schematically shown in FIG. 1E, the mold 106 is brought into contact with the practically continuous liquid film 104 of the curable composition (A) from which the solvent (d) is removed. The contact step includes a step of a changing a state in which the curable composition (A) and the mold 106 are not in contact with each other to a state in which they are in contact with each other, and a step of maintaining the state in which they are in contact with each other. As a consequence, the liquid of the curable composition (A) is filled in recesses of fine patterns on the surface of the mold 106, and the filled liquid forms a liquid film filled in the fine patterns of the mold 106.

In the present invention, the curable composition (A) forms the practically continuous liquid film 104 from which the solvent (d) is removed in the waiting step, so the volume of a gas involved between the mold 106 and the substrate 101 becomes small. Accordingly, filling of the curable composition (A) in the contact step is rapidly completed. FIG. 3 shows the comparison (difference) between the contact step in the related art disclosed in patent literature 1 and the like and the contact step of the present invention.

When filling of the curable composition (A) is quickly completed in the contact step, it is possible to shorten the time (the time required for the contact step) for maintaining the state in which the mold 106 is in contact with the curable composition (A). Since shortening the time required for the contact step leads to shortening the time required for pattern formation (film formation), the productivity improves. The contact step is preferably 0.1 sec or more and 3 sec or less, and particularly preferably 0.1 sec or more and 1 sec or less. If the contact step is shorter than 0.1 sec, filling becomes insufficient, so many defects called incomplete filling defects tend to occur.

When the curing step includes a photoirradiation step, a mold made of a light-transmitting material is used as the mold 106 by taking this into consideration. Favorable practical examples of the type of the material forming the mold 106 are glass, quartz, PMMA, a photo-transparent resin such as a polycarbonate resin, a transparent metal deposition film, a soft film such as polydimethylsiloxane, a photo-cured film, and a metal film. Note that when using the photo-transparent resin as the material forming the mold 106, a resin that does not dissolve in components contained in a curable composition is selected. Quartz is suitable as the material forming the mold 106 because the thermal expansion coefficient is small and pattern distortion is small.

A pattern formed on the surface of the mold 106 has a height of, for example, 4 nm or more and 200 nm or less. As the pattern height of the mold 106 decreases, it becomes possible to decrease the force of releasing the mold 106 from the cured film of the curable composition, that is, the mold release force in the mold release step, and this makes it possible to decrease the number of mold release defects remaining in the mold 106 because the pattern of the curable composition is torn off. Also, in some cases, the pattern of the curable composition elastically deforms due to the impact when the mold is released, and adjacent pattern elements come in contact with each other and adhere to each other or break each other. Note that to avoid these inconveniences, it is advantageous to make the height of pattern elements be about twice or less the width of the pattern elements (make the aspect ratio be 2 or less). On the other hand, if the height of pattern elements is too small, the processing accuracy of the substrate 101 decreases.

A surface treatment can also be performed on the mold 106 before performing the contact step, in order to improve the detachability of the mold 106 with respect to the curable composition (A). An example of this surface treatment is to form a mold release agent layer by coating the surface of the mold 106 with a mold release agent. Examples of the mold release agent to be applied on the surface of the mold 106 are a silicon-based mold release agent, a fluorine-based mold release agent, a hydrocarbon-based mold release agent, a polyethylene-based mold release agent, a polypropylene-based mold release agent, a paraffine-based mold release agent, a montane-based mold release agent, and a carnauba-based mold release agent. It is also possible to suitably use a commercially available coating-type mold release agent such as Optool® DSX manufactured by Daikin. Note that it is possible to use one type of a mold release agent alone, or use two or more types of mold release agents together. Of the mold release agents described above, fluorine-based and hydrocarbon-based mold release agents are particularly favorable.

In the contact step, the pressure to be applied to the curable composition (A) when bringing the mold 106 into contact with the curable composition (A) is not particularly limited, and is, for example, 0 MPa or more and 100 MPa or less. Note that when bringing the mold 106 into contact with the curable composition (A), the pressure to be applied to the curable composition (A) is preferably 0 MPa or more and 50 MPa or less, more preferably 0 MPa or more and 30 MPa or less, and further preferably 0 MPa or more and 20 MPa or less.

The contact step can be performed in any of a normal air atmosphere, a reduced-pressure atmosphere, and an inert-gas atmosphere. However, the reduced-pressure atmosphere or the inert-gas atmosphere is favorable because it is possible to prevent the influence of oxygen or water on the curing reaction. Practical examples of an inert gas to be used when performing the contact step in the inert-gas atmosphere are nitrogen, carbon dioxide, helium, argon, various freon gases, and gas mixtures thereof. When performing the contact step in a specific gas atmosphere including a normal air atmosphere, a favorable pressure is 0.0001 atm or more and 10 atm or less.

Curing Step

Figure 1F:
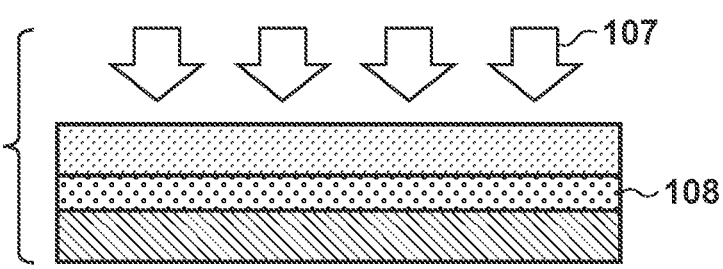

In the curing step as schematically shown in FIG. 1F, the curable composition (A) is cured by being irradiated with irradiation light 107 as curing energy, thereby forming a cured film. In the curing step, for example, the curable composition (A) is irradiated with the irradiation light 107 through the mold 106. More specifically, the curable composition (A) filled in the fine pattern of the mold 106 is irradiated with the irradiation light 107 through the mold 106. Consequently, the curable composition (A) filled in the fine pattern of the mold 106 is cured and forms a cured film 108 having the pattern.

The irradiation light 107 is selected in accordance with the sensitivity wavelength of the curable composition (A). More specifically, the irradiation light 107 is properly selected from ultraviolet light, X-ray, and an electron beam each having a wavelength of 150 nm or more and 400 nm or less. Note that the irradiation light 107 is particularly preferably ultraviolet light. This is so because many compounds commercially available as curing assistants have sensitivity to ultraviolet light. Examples of a light source that emits ultraviolet light are a high-pressure mercury lamp, an ultra-high-pressure mercury lamp, a low-pressure mercury lamp, a Deep-UV lamp, a carbon arc lamp, a metal halide lamp, a xenon lamp, a KrF excimer laser, an ArF excimer laser, and an $F_2$ laser. Note that the ultrahigh-pressure mercury lamp is particularly favorable as the light source for emitting ultraviolet light. It is possible to use one light source or a plurality of light sources. Light can be emitted to the entire region of the curable composition (A) filled in the fine pattern of the mold, or to only a partial region thereof (by limiting the region). It is also possible to intermittently emit light to the entire region of the substrate a plurality of times, or to continuously emit light to the entire region of the substrate. Furthermore, a first region of the substrate can be irradiated with light in a first irradiation process, and a second region different from the first region of the substrate can be irradiated with light in a second irradiation process.

Mold Release Step

Figure 1G:
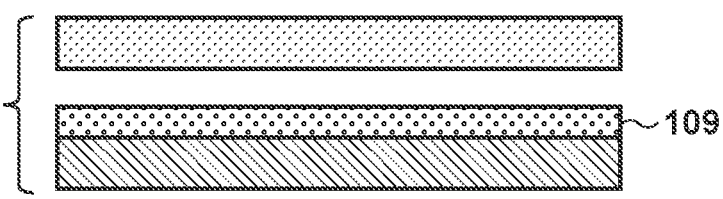

In the mold release step as schematically shown in FIG. 1G, the mold 106 is released from the cured film 108. When the mold 106 is released from the cured film 108 having the pattern, the film 108 having a pattern formed by inverting the fine pattern of the mold 106 is obtained in an independent state. In this state, a cured film remains in recesses of the cured film 108 having the pattern. This film is called a residual film.

A method of releasing the mold 106 from the cured film 108 having the pattern can be any method provided that the method does not physically break a part of the cured film 108 having the pattern during the release, and various conditions and the like are not particularly limited. For example, it is possible to fix the substrate 101 and move the mold 106 away from the substrate 101. It is also possible to fix the mold 106 and move the substrate 101 away from the mold 106. Furthermore, the mold 106 can be released from the cured film 108 having the pattern by moving both the mold 106 and the substrate 101 in exactly opposite directions.

Repetition

A series of steps (a fabrication process) having the above-described steps from the arranging step to the mold release step in this order make it possible to obtain a cured film having a desired uneven pattern shape (a pattern shape conforming to the uneven shape of the mold 106) in a desired position.

In the pattern forming method of the present invention, a repetition unit (shot) from the arranging step to the mold release step can repetitively be performed a plurality of times on the same substrate, so the cured film 108 having a plurality of desired patterns in desired positions of the substrate can be obtained.

Planarization Film Forming Method

An example in which the film forming method of the present invention is applied to a planarization film forming method will be explained below. The planarization film forming method includes, for example, an arranging step, a waiting step, a contact step, a curing step, and a mold release step. The arranging step is a step of arranging droplets of the curable composition (A) on a substrate. The waiting step is a step of waiting until the droplets of the curable composition (A) combine with each other and the solvent (d) volatilizes. The contact step is a step of bringing the curable composition (A) and a mold into contact with each other. The curing step is a step of curing the curable composition (A). The mold release step is a step of releasing the mold from the cured film of the curable composition (A). In the planarization film forming method, a substrate having unevenness having a difference in height of about 10 to 1,000 nm is used as the substrate, a mold having a flat surface is used as the mold, and a cured film having a surface conforming to the flat surface of the mold is formed through the contact step, the curing step, and the mold release step. In the arranging step, the droplets of the curable composition (A) are densely arranged in recesses of the substrate, and sparsely arranged on projections of the substrate. The waiting step is performed after the arranging step, the contact step is performed after the waiting step, the curing step is performed after the contact step, and the mold release step is performed after the curing step.

Article Manufacturing Method

A cured film having a pattern formed by the pattern forming method of the present invention can directly be used as at least a partial constituent member of various kinds of articles. Also, a cured film having a pattern formed by the pattern forming method of the present invention can temporarily be used as a mask for etching or ion implantation with respect to a substrate (a layer to be processed when the substrate has the layer to be processed). This mask is removed after etching or ion implantation is performed in a substrate processing step. Consequently, various kinds of articles can be manufactured.

When removing a cured product in recesses of a pattern of the cured product by etching, a practical method is not particularly limited, and a conventional method such as dry etching can be used. A conventional dry etching apparatus can be used in this dry etching. A source gas for dry etching is appropriately selected in accordance with an element composition of the cured product to be etched. As the source gas, it is possible to use halogen gases such as $CF_4$, $C_2F_6$, $C_3F_8$, $CCl_2F_2$, $CCl_4$, $CBrF_3$, $BCl_3$, $PCl_3$, $SF_6$, and $Cl_2$. As the source gas, it is also possible to use gases containing oxygen atoms such as $O_2$, CO, and $CO_2$, inert gases such as He, $N_2$, and Ar, and gases such as $H_2$ and $NH_3$. Note that these gases can also be used as a gas mixture. In this case, the cured film is required to have a high dry etching resistance in order to process the substrate as a base with high yield.

An article is, for example, an electric circuit element, an optical element, MEMS, a recording element, a sensor, or a mold. Examples of the electric circuit element are volatile or nonvolatile semiconductor memories such as a DRAM, an SRAM, a flash memory, and an MRAM, and semiconductor elements such as an LSI, a CCD, an image sensor, and an FPGA. Examples of the optical element are a micro lens, a light guide body, a waveguide, an antireflection film, a diffraction grating, a polarizer, a color filter, a light-emitting element, a display, and a solar battery. Examples of the MEMS are a DMD, a microchannel, and an electromechanical transducer. Examples of the recording element are optical disks such as a CD and a DVD, a magnetic disk, a magneto-optical disk, and a magnetic head. Examples of the sensor are a magnetic sensor, a photosensor, and a gyro sensor. An example of the mold is a mold for imprinting.

In addition, a well-known photolithography step such as an imprint lithography technique or an extreme ultraviolet exposure technique (EUV) can be performed on the planarization film formed by the planarization film forming method of the present invention. It is also possible to stack a spin-on-glass (SOG) film and/or a silicon oxide layer, and perform a photolithography step by applying a curable composition on that. Consequently, a device such as a semiconductor device can be fabricated. It is further possible to form an apparatus including the device, for example, an electronic apparatus such as a display, a camera, or a medical apparatus. Examples of the device are an LSI, a system LSI, a DRAM, an SDRAM, an RDRAM, a D-RDRAM, and a NAND flash memory.

EXAMPLES

More practical examples will be explained below in order to supplement the above-described embodiments.

Viscosity Calculation Method

In this example, the viscosity of the curable composition (A) was calculated by using a molecular dynamics calculation (see literature B) with respect to a molecular aggregate containing 10 gas molecules for 250 molecules forming the curable composition (A).

Literature B: M. P. Allen, Computational soft matter: from synthetic polymers to proteins, 23(1), 1-28 (2004)

In this example, the molecular dynamics calculation was performed by using LAMMPS-12 December 2018 (Copyright (2003) Sandia Corporation.)

The molecular dynamics calculation includes four stages, that is, a compression process calculation, a relaxation process calculation, an equilibration process calculation, and an SLLOD calculation. The compression process calculation is performed to form an appropriate molecular aggregate. The equilibration process calculation is performed to guide a molecular aggregate to a thermodynamic equilibrium state. A simulation box of the calculations up to this point is a cube. The SLLOD calculation is nonequilibrium molecular dynamics that gives frictional force between molecules by forcedly inducing a Couette flow (steady simple shear flow) in a molecular aggregate (see literatures C and D).

Literature C: P. J. Daivis and B. D. Todd, J. Chem. Phys, 124, 194103 (2006).

Literature D: B. J. Edwards, C. Baig, and D. J. Keffer, J. Chem. Phys. 124, 194104 (2006).

Figure 4:
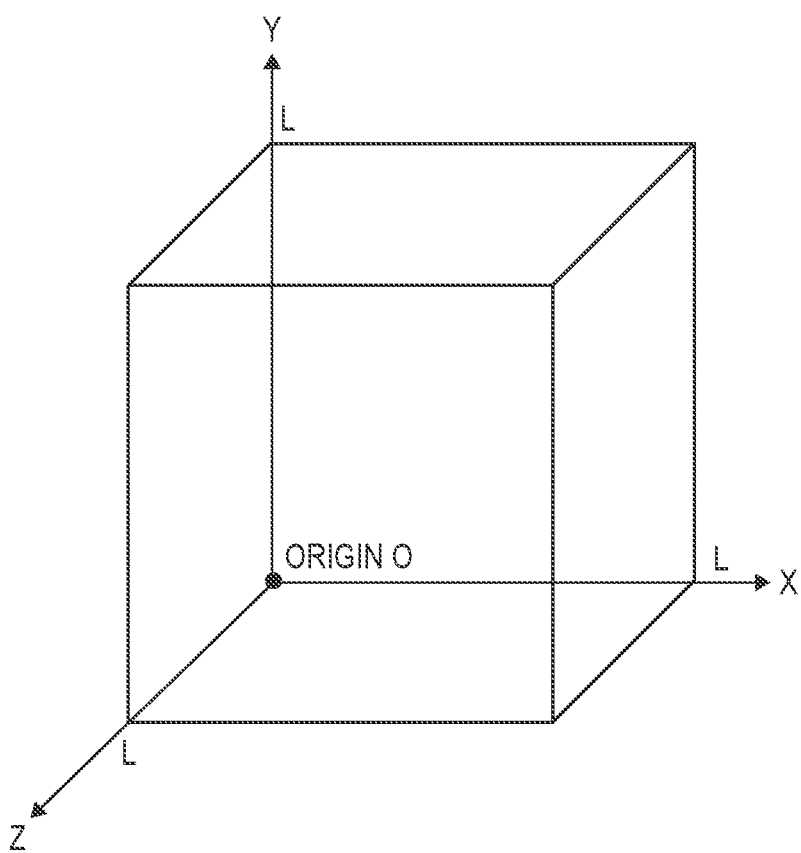
FIG. 4 is a view for explaining an SLLOD method calculation.

In this example, as shown in FIG. 4. it is assumed that a simulation box is a cube each side of which has a length L immediately before the SLLOD calculation is started. It is also assumed that orthogonal coordinate axes are set in this simulation box such that one vertex of the cube is the origin, and each side is parallel to the X-, Y-, or Z-axis. Furthermore, it is assumed that after the SLLOD calculation is started, a Couette flow is induced such that the direction of the flow is parallel to the X-axis, and the velocity field slope direction is parallel to the Y-axis. To induce a Couette flow like this, as shown in FIG. 5, a plane in which Y=0 of the simulation box is fixed, and a plane in which Y=L of the simulation box is moved in the X direction at a constant velocity v, thereby continuously distorting the simulation box itself. In this case, an uncorrected viscosity calculation value $\eta 0$ can be calculated from the frictional force acting between molecules by using equation: $\eta 0 = -<\sigma xy>/s$. Note that s is an amount called a distortion rate, and $\sigma xy$ represents the xy components of a stress tensor acting on molecules and represents that both the statistical average and the time average are taken.

The distortion rate s is calculated by equation: $s=v/L$ by assuming that the length of each side of the simulation box that is a cube when the calculation is started. To predict an actual viscosity, however, the calculation value must be corrected by using equation: $\eta=\eta 0 \times 2.270+1.722$. Note that the corrected calculation vale is $\eta$. In this equation, mPa·s is assumed as a unit.

Details of the calculation conditions are as follows. A periodic boundary condition is imposed on all the calculations. PPPM (particle-particle-particle-mesh Ewald) method (see literature E) is used to efficiently calculate the electrostatic force as a long-distance force. To realize stable calculations, a SHAKE algorithm (see literature F) that imposes a constraint condition on a specific bond angle or bond length is used.

Literature E: J. W. Eastwood, R. W. Hockney, D. N. Lawrence, Computer Physics Communications 35, 618 (1984).

Literature F: J.-P. Ryckaert, G. Ciccotti and H. J. C. Berendsen, J of Comp Phys, 23, 327-341 (1977).

Calculation conditions to be used in the compression process calculation are a temperature set value of 700K, a pressure set value of 10,000 atm, a simulation time of 10 ps, a step time of 0.5 fs, a temperature relaxation time of 10 fs, and a compression ratio relaxation time of 100 ps. Also, this is a constant-temperature, constant-pressure simulation using the Nose-Hoover method (see literatures G and H).

Literature G: Nose, Shuichi (1984). "A unified formulation of the constant temperature molecular-dynamics methods". Journal of Chemical Physics 81 (1): 511-519.

Literature H: Hoover, William G. (1985). "Canonical dynamics: Equilibrium phase-space distributions". Phys. Rev. A 31 (3): 1695-1697.

Calculation conditions to be used in the relaxation process calculation are a temperature set value of 700K, a pressure set value of 1 atm, a simulation time of 100 ps, a temperature relaxation time of 10 fs, and a compression ratio relaxation time of 100 ps. Also, this is a constant-temperature, constant-pressure simulation using the Nose-Hoover method.

Calculation conditions to be used in the equilibration process calculation are a temperature set value of 300K, a pressure set value of 1 atm, a simulation time of 2 ns, a temperature relaxation time of 10 fs, and a compression ratio relaxation time of 100 ps. Also, this is a constant-temperature, constant-pressure simulation using the Nose-Hoover method.

Calculation conditions to be used in the SLLOD calculation are a temperature set value of 300K, a simulation time of 8.5 ns, and a temperature relaxation time of 10 fs.

The velocity when distorting the simulation box of the constant-temperature simulation using the Nose-Hoover method is 1 nm/ns. When calculating the time average, the value of stress tensor at 7.5 nm to 8 ns is used.

To perform the molecular dynamics calculation, a parameter called a force field parameter for defining the interaction between atoms must be set beforehand. The force field parameter includes two types of parameters, that is, an electrostatic force field parameter and a non-electrostatic force field parameter.

The following was used for the electrostatic force field parameter.

An electric charge to be allocated to each atom, which is obtained by performing electric charge fitting by using a point based on the MERZ-Singh-Killmans scheme (see literatures I and J) with respect to an electrostatic potential calculated by the Kohn-Sham method (an exchange correlation functional is B3LYP), a basic function 6-31 g*) as one method of a quantum chemical calculation.

Literature I: B. H. Besler, K. M. Merz Jr., and P. A. Kollman, J. Comp. Chem. 11, 431 (1990).

Literature J: U. C. Singh and P. A. Kollman, J. Comp. Chem. 5, 129 (1984).

More specifically, in this example, the quantum chemical calculations were performed by using the following. Gaussian 09 manufactured by Gaussian, Revision D.01 (Gaussian 09, Revision D.01, M. J. Frisch, G. W. Trucks, H. B. Schlegel, G. E. Scuseria, M. A. Robb, J. R. Cheeseman, G. Scalmani, V. Barone, B. Mennucci, G. A. Petersson, H. Nakatsuji, M. Caricato, X. Li, H. P. Hratchian, A. F. Izmaylov, J. Bloino, G. Zheng, J. L. Sonnenberg, M. Hada, M. Ehara, K. Toyota, R. Fukuda, J. Hasegawa, M. Ishida, T. Nakajima, Y. Honda, O. Kitao, H. Nakai, T. Vreven, J. A. Montgomery, Jr., J. E. Peralta, F. Ogliaro, M. Bearpark, J. J. Heyd, E. Brothers, K. N. Kudin, V. N. Staroverov, T. Keith, R. Kobayashi, J. Normand, K. Raghavachari, A. Rendell, J. C. Burant, S. S. Iyengar, J. Tomasi, M. Cossi, N. Rega, J. M. Millam, M. Klene, J. E. Knox, J. B. Cross, V. Bakken, C. Adamo, J. Jaramillo, R. Gomperts, R. E. Stratmann, O. Yazyev, A. J. Austin, R. Cammi, C. Pomelli, J. W. Ochterski, R. L. Martin, K. Morokuma, V. G. Zakrzewski, G. A. Voth, P. Salvador, J. J. Dannenberg, S. Dapprich, A. D. Daniels, O. Farkas, J. B. Foresman, J. V. Ortiz, J. Cioslowski, and D. J. Fox, Gaussian, Inc., Wallingford CT, 2013.)

As the non-electrostatic force field parameter, a general Amber force field (GAFF (literature K)) to be used for general organic molecules was used.

Literature K: Wang, J., Wolf, R. M., Caldwell, J. W., Kollman, P. A., Case, D. A., J. Comp. Chem. 25, 1157(2004)

Table 1 below shows the viscosity calculation results obtained by the above-described viscosity calculation method. Note that Table 1 shows the corrected viscosity values described above.

TABLE 1

Viscosity Calculation Results

| Compound Name | Viscosity Calculation Value [mPa · s] |
|---|---|
| 3,3',5,5'-tetravinyl-1,1'-viphenyl | 39.76 |
| Bis(3,5-divinylphenyl)methane | 23.00 |
| 1,2,4,5-tetravinylbenzene | 6.11 |
| 3,3',4,4'-tetravinyl-1,1'-biphenyl | 28.93 |
| 5,5'-oxybis(1,3-divinylbenzene) | 10.06 |
| 4,4'-oxybis(1,2-divinylbenzene) | 78.78 |
| 2,2'-oxybis(1,4-divinylbenzene) | 20.73 |
| Bis(3,5-divinylphenyl)methanone | 178.28 |
| Bis(3,4-divinylphenyl)methanone | 13.68 |
| Bis(2,5-divinylphenyl)methanone | 50.36 |
| 1,3,5,7-tetravinylnaphthalene | 55.93 |
| 1,3,6,8-tetravinylnaphthalene | 23.11 |
| 1,4,5,8-tetravinylnaphthalene | 34.47 |
| 1,3,5,8-tetravinylnaphthalene | 31.34 |

Polymerizable compounds calculated in the examples are as follows.

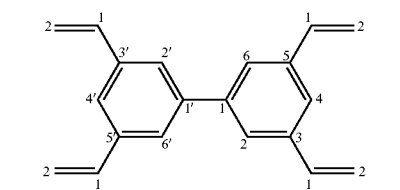

3,3',5,5'-tetravinyl-1,1'-biphenyl

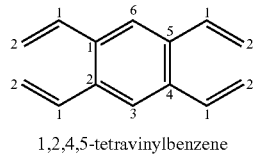

1,2,4,5-tetravinylbenzene

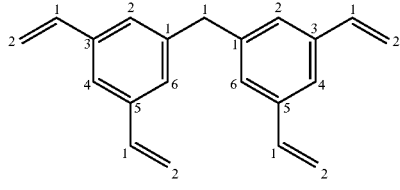

Bis(3,5-divinylphenyl)methane

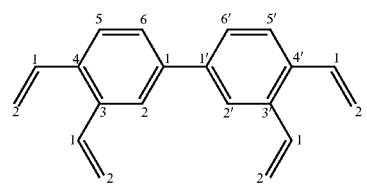

3,3',4,4'-tetravinyl-1,1'-biphenyl

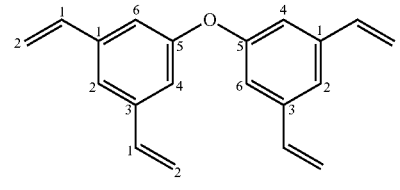

5,5'-oxybis(1,3-divinylbenzene)

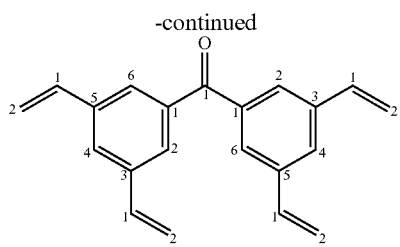

Bis(3,5-divinylphenyl)methanone

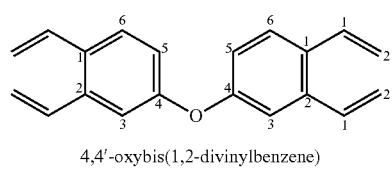

4,4'-oxybis(1,2-divinylbenzene)

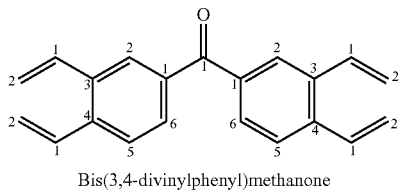

Bis(3,4-divinylphenyl)methanone

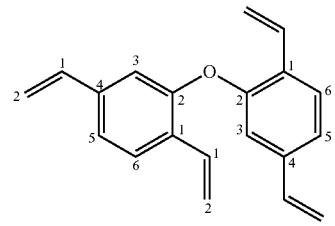

2,2'-oxybis(1,4-divinylbenzene)

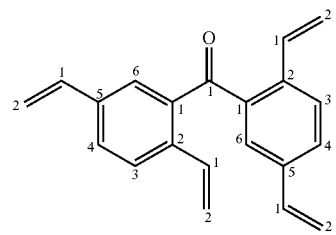

Bis(2,5-divinylphenyl)methanone

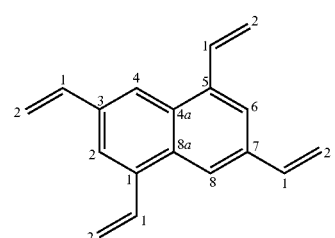

1,3,5,7-tetravinylnapthalene

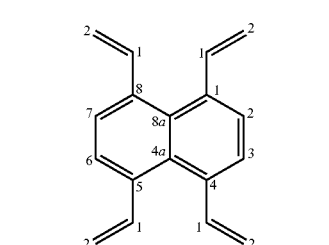

1,4,5,8-tetravinylnapthalene

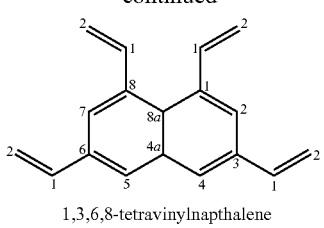

1,3,6,8-tetravinylnapthalene

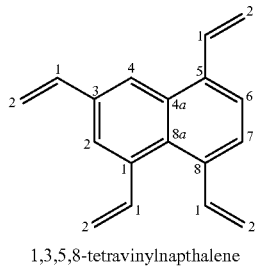

1,3,5,8-tetravinylnapthalene

Example 1, Comparative Example 1, Comparative Example 2

Preparation of Curable Compositions

A curable composition S1, a curable composition S2, and a curable composition S3 were respectively prepared as Example 1, Comparative Example 1, and Comparative Example 2.

The curable composition S1 contains four vinyl groups directly bonding to an aromatic ring, and contains a polymerizable compound represented by the following formula as a component (a-1)

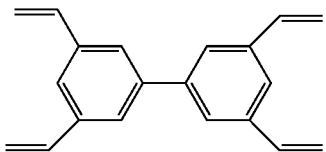 [SMILES: C=Cc1cc(C=C)cc(-c2cc(C=C)cc(C=C)c2)c1]

The curable composition S2 contains three vinyl groups directly bonding to an aromatic ring, and contains a polymerizable compound represented by the following formula as the component (a-1).

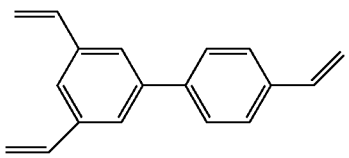 [SMILES: C=Cc1ccc(-c2cc(C=C)cc(C=C)c2)cc1]

The curable composition S3 contains two vinyl groups directly bonding to an aromatic ring, and contains a polymerizable compound represented by the following formula as the component (a-1).

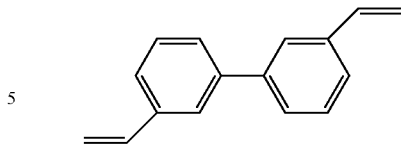

The curable compositions S1, S2, and S3 contain 2.91 wt % of photopolymerization initiator IGM Omnirad 819 (formerly known as Irgacure 819) as a component (b), with respect to the weight of the polymerizable compound as a main component. Also, the curable compositions S1, S2, and S3 further contain 0.97 wt % of a surfactant (Chemguard 5554) as a component (c), with respect to the weight of the polymerizable compound as a main component.

Curing

Curing was performed by coating a glass substrate with a curable composition liquid film having a thickness of about 100 nm, and exposing this liquid film to UV light having an intensity of 25 mW/cm$^2$ for 80 sec. This is equivalent to a curing energy amount of 2.4 J/cm$^2$.

Heat Treatment

A heat treatment was performed twice on the cured layer. In the first heat treatment, heating was performed to a temperature of 250° C. at a rate of 10° C./min, and the temperature was held at 250° C. for 1 hr. In the second heat treatment, the temperature was decreased to 0° C. after the first heat treatment, and heating was performed to a temperature of 450° C. at a rate of 20° C./min. In the second heat treatment, attention was paid to the range of 260° C. to 450° C. which is higher than the maximum temperature (250° C.) in the first heat treatment, and immediately before a temperature at which a large weight reduction occurs due to complete decomposition of the polymer material.

Measurement of Heat Resistance

The heat resistance was measured during the second heat treatment in a nitrogen atmosphere, at a flow rate of 5 to 6 L/hr, and at a heating rate of 20° C./min, by TGA measurement using the STA 1000 apparatus of Linseis. If the weight reduction ratio was 2% or less when the temperature was raised from 260° C. to 450° C., it was determined that the heat resistance was 450° C.

Example 1

When the curing and the heat treatment were performed by the above-described method and the heat resistance was measured, the curable composition S1 showed a heat resistance of 450° C.

Comparative Example 1

When the curing and the heat treatment were performed by the above-described method and the heat resistance was measured, the curable composition S2 showed no heat resistance of 450° C.

Comparative Example 2

When the curing and the heat treatment were performed by the above-described method and the heat resistance was measured, the curable composition S3 showed no heat resistance of 450° C.

The disclosure of this specification includes the following curable compositions, film forming methods, and article manufacturing methods.

Item 1
A curable composition containing a polymerizable compound (a), a photopolymerization initiator (b), and a solvent (c), wherein the curable composition has viscosity of not less than 2 mPa·s and not more than 60 mPa·s at 23° C.,
  a content of the solvent (d) with respect to the whole curable composition is not less than 5 vol % and not more than 95 vol %,
  a boiling point of the solvent (d) at normal pressure is less than 250° C., and
  the polymerizable compound (a) contains a compound (a-1) containing not less than one aromatic ring or aromatic heterocycle, and not less than four vinyl groups directly bonding to the aromatic ring or the aromatic heterocycle.

Item 2
The curable composition according to item 1, wherein a ratio of the compound (a-1) in the polymerizable compound (a) is not less than 20 wt %.

Item 3
The curable composition according to item 1, wherein the ratio of the compound (a-1) in the polymerizable compound (a) is not less than 50 wt %.

Item 4
The curable composition according to item 1, wherein the ratio of the compound (a-1) in the polymerizable compound (a) is not less than 90 wt %.

Item 5
The curable composition according to any one of items 1 to 4, wherein a weight reduction when a cured product of the compound (a-1) is heated from 260° C. to 350° C. at a heating rate of 20° C./min is not more than 2%.

Item 6
The curable composition according to any one of items 1 to 4, wherein a weight reduction when a cured product of the compound (a-1) is heated from 260° C. to 400° C. at a heating rate of 20° C./min is not more than 2%.

Item 7
The curable composition according to any one of items 1 to 4, wherein a weight reduction when a cured product of the compound (a-1) is heated from 260° C. to 450° C. at a heating rate of 20° C./min is not more than 2%.

Item 8
The curable composition according to any one of items 1 to 7, wherein
  the polymerizable compound (a) contains not less than one type of a polymerizable compound, and
  a boiling point of each of the not less than one type of the polymerizable compound at normal pressure is not less than 250° C.

Item 9
The curable composition according to any one of items 1 to 8, wherein
  the polymerizable compound (a) contains not less than one type of a polymerizable compound, and
  a molecular weight of each of the not less than one type of the polymerizable compound is not less than 200.

Item 10
The curable composition according to item 1, wherein
  the solvent (d) contains not less than one type of a solvent, and
  a boiling point of each of the not less than one type of the solvent at normal pressure is not less than 80° C. and less than 250° C.

Item 11
The curable composition according to any one of items 1 to 10, wherein the solvent (d) contains a polymerizable compound having a boiling point of not less than 80° C. and less than 250° C. at normal pressure.

Item 12
The curable composition according to any one of items 1 to 11, wherein
  the solvent (d) contains not less than one type of a solvent, and
  a boiling point of each of the not less than one type of the solvent at normal pressure is not less than 150° C. and less than 200° C.

Item 13
The curable composition according to any one of items 1 to 12, further containing at least a polymer having a polymerizable functional group as the polymerizable compound (a).

Item 14
The curable composition according to any one of items 1 to 13, wherein a glass transition temperature of a cured product formed by curing the polymerizable compound (a) in a state in which the solvent (d) is removed is not less than 70° C.

Item 15
The curable composition according to any one of items 1 to 14, wherein
  the polymerizable compound (a) contains a plurality of types of polymerizable compounds, and
  a vapor pressure of each of the plurality of types of polymerizable compounds at 80° C. is not more than 0.001 mmHg.

Item 16
The curable composition according to any one of items 1 to 15, wherein a content of the solvent (d) with respect to the whole curable composition is not less than 70 vol % and not more than 85 vol %.

Item 17
The curable composition according to any one of items 1 to 16, wherein the curable composition is an inkjet curable composition.

Item 18
A film forming method of forming a film of a curable composition in a space between a mold and a substrate, comprising:
  an arranging step of discretely arranging a plurality of droplets of a curable composition defined in any one of items 1 to 17 on the substrate;
  a waiting step of waiting until the plurality of droplets discretely arranged on the substrate combine with their respective adjacent droplets and form a continuous liquid film on the substrate, and a solvent contained in the liquid film volatilizes; and
  a contact step of bringing the mold and the liquid film on the substrate into contact with each other after the waiting step.

Item 19
The film forming method according to item 18, wherein the waiting step waits until a content of the solvent becomes not more than 10 vol % with respect to the whole liquid film.

Item 20
The film forming method according to item 18 or 19, wherein in the waiting step, the substrate is heated at not less than 30° C. and not more than 200° C. for not less than 10 sec and not more than 600 sec.

Item 21
The film forming method according to any one of items 18 to 20, wherein in the arranging step, droplets each having a volume of not less than 1.0 pL of the curable composition are arranged on the substrate at a density of not less than 80 droplets/mm$^2$.

Item 22

The film forming method according to any one of items 18 to 21, wherein an average residual liquid film thickness as a value obtained by dividing a volume of the curable composition remaining after the waiting step by an area of a film formation region of the mold is not more than 20 nm.

Item 23

The film forming method according to any one of items 18 to 22, wherein
  the mold includes a pattern,
  the pattern of the mold and the liquid film on the substrate are brought into contact with each other in the contact step, and
  the film forming method further comprises, after the contact step, a curing step of curing the liquid film, thereby forming a cured film having a pattern corresponding to the pattern of the mold.

Item 24

The film forming method according to any one of items 18 to 22, wherein
  the mold includes a flat surface,
  the flat surface of the mold and the liquid film on the substrate are brought into contact with each other in the contact step, and
  the film forming method further comprises, after the contact step, a curing step of curing the liquid film, thereby forming a cured film having a surface conforming to the flat surface of the mold.

Item 25

The film forming method according to any one of items 18 to 24, wherein in the arranging step, the plurality of droplets are discretely arranged on the substrate by using an inkjet method.

Item 26

An article manufacturing method comprising:
  a step of forming a film of a curable composition on a substrate by using a film forming method defined in any one of items 18 to 25;
  a step of processing the substrate on which the film is formed in the step of forming; and
  a step of manufacturing an article from the processed substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A curable composition containing:
  a polymerizable compound;
  a photopolymerization initiator;
  and a solvent,
  wherein
    the curable composition has viscosity of not less than 2 mPa·s and not more than 60 mPa·s at 23° C.,
    a content of the solvent with respect to the whole curable composition is not less than 5 vol % and not more than 95 vol %,
    a boiling point of the solvent at normal pressure is less than 250° C., and
    the polymerizable compound contains a compound containing not less than one aromatic ring or aromatic heterocycle, and not less than four vinyl groups directly bonding to the aromatic ring or the aromatic heterocycle,
    the polymerizable compound contains a plurality of types of polymerizable compounds, and
    a vapor pressure of each of the plurality of types of polymerizable compounds at 80° C. is not more than 0.001 mmHg.

2. A curable composition containing:
  a polymerizable compound;
  a photopolymerization initiator;
  and a solvent,
  wherein
    the curable composition has viscosity of not less than 2 mPa·s and not more than 60 mPa·s at 23° C.,
    a content of the solvent with respect to the whole curable composition is not less than 70 vol % and not more than 85 vol %,
    a boiling point of the solvent at normal pressure is less than 250° C., and
    the polymerizable compound contains a compound containing not less than one aromatic ring or aromatic heterocycle, and not less than four vinyl groups directly bonding to the aromatic ring or the aromatic heterocycle.

3. The curable composition according to claim 2, wherein the curable composition is an inkjet curable composition.

4. A film forming method of forming a film of a curable composition in a space between a mold and a substrate, comprising:
  an arranging step of discretely arranging a plurality of droplets of a curable composition on the substrate;
  a waiting step of waiting until the plurality of droplets discretely arranged on the substrate combine with their respective adjacent droplets and form a continuous liquid film on the substrate, and a solvent contained in the liquid film volatilizes; and
  a contact step of bringing the mold and the liquid film on the substrate into contact with each other after the waiting step,
  wherein the curable composition contains:
    a polymerizable compound;
    a photopolymerization initiator; and
    a solvent, and
  wherein
    the curable composition has viscosity of not less than 2 mPa·s and not more than 60 mPa·s at 23° C.,
    a content of the solvent with respect to the whole curable composition is not less than 5 vol % and not more than 95 vol %,
    a boiling point of the solvent at normal pressure is less than 250° C., and
    the polymerizable compound contains a compound containing not less than one aromatic ring or aromatic heterocycle, and not less than four vinyl groups directly bonding to the aromatic ring or the aromatic heterocycle.

5. The film forming method according to claim 4, wherein the waiting step waits until a content of the solvent becomes not more than 10 vol % with respect to the whole liquid film.

6. The film forming method according to claim 4, wherein in the waiting step, the substrate is heated at not less than 30° C. and not more than 200° C. for not less than 10 sec and not more than 600 sec.

7. The film forming method according to claim 4, wherein in the arranging step, droplets each having a volume of not less than 1.0 pL of the curable composition are arranged on the substrate at a density of not less than 80 droplets/mm$^2$.

8. The film forming method according to claim 4, wherein an average residual liquid film thickness as a value obtained by dividing a volume of the curable composition remaining after the waiting step by an area of a film formation region of the mold is not more than 20 nm.

9. The film forming method according to claim 4, wherein
the mold includes a pattern,
the pattern of the mold and the liquid film on the substrate are brought into contact with each other in the contact step, and
the film forming method further comprises, after the contact step, a curing step of curing the liquid film, thereby forming a cured film having a pattern corresponding to the pattern of the mold.

10. The film forming method according to claim 4, wherein
the mold includes a flat surface,
the flat surface of the mold and the liquid film on the substrate are brought into contact with each other in the contact step, and
the film forming method further comprises, after the contact step, a curing step of curing the liquid film, thereby forming a cured film having a surface conforming to the flat surface of the mold.

11. The film forming method according to claim 4, wherein in the arranging step, the plurality of droplets are discretely arranged on the substrate by using an inkjet method.

12. An article manufacturing method comprising:
a step of forming a film of a curable composition on a substrate by using a film forming method defined in claim 4;
a step of processing the substrate on which the film is formed in the step of forming; and
a step of manufacturing an article from the processed substrate.

* * * * *